(12) United States Patent
Tu et al.

(10) Patent No.: US 8,406,307 B2
(45) Date of Patent: Mar. 26, 2013

(54) ENTROPY CODING/DECODING OF HIERARCHICALLY ORGANIZED DATA

(75) Inventors: Chengjie Tu, Sammamish, WA (US); Shankar Regunathan, Bellevue, WA (US); Shijun Sun, Redmond, WA (US); Chih-Lung Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1187 days.

(21) Appl. No.: 12/197,124

(22) Filed: Aug. 22, 2008

(65) Prior Publication Data

US 2010/0046626 A1 Feb. 25, 2010

(51) Int. Cl.
*H04N 7/12* (2006.01)
*H03M 7/40* (2006.01)

(52) U.S. Cl. ..................... 375/240.23; 341/67
(58) Field of Classification Search .......... None
See application file for complete search history.

(56) References Cited

U.S. PATENT DOCUMENTS

| | | |
|---|---|---|
| 4,420,771 A | 12/1983 | Pirsch |
| 4,698,672 A | 10/1987 | Chen |
| 4,730,348 A | 3/1988 | MacCrisken |
| 4,792,981 A | 12/1988 | Cahill et al. |
| 4,813,056 A | 3/1989 | Fedele |
| 4,901,075 A | 2/1990 | Vogel |
| 4,968,135 A | 11/1990 | Wallace et al. |
| 5,043,919 A | 8/1991 | Callaway et al. |
| 5,089,818 A | 2/1992 | Mahieux et al. |
| 5,109,451 A | 4/1992 | Aono et al. |
| 5,128,758 A | 7/1992 | Azadegan |
| 5,146,324 A | 9/1992 | Miller et al. |
| 5,179,442 A | 1/1993 | Azadegan |
| 5,227,788 A | 7/1993 | Johnston |
| 5,227,878 A | 7/1993 | Puri et al. |
| 5,253,053 A | 10/1993 | Chu et al. |
| 5,266,941 A | 11/1993 | Akeley et al. |
| 5,270,832 A | 12/1993 | Balkanski et al. |
| 5,367,629 A | 11/1994 | Chu et al. |
| 5,373,513 A | 12/1994 | Howe et al. |

(Continued)

FOREIGN PATENT DOCUMENTS

| | | |
|---|---|---|
| EP | 0 540 350 | 5/1993 |
| EP | 0 663 773 | 7/1995 |

(Continued)

OTHER PUBLICATIONS

U.S. Appl. No. 60/341,674, filed Dec. 17, 2001, Lee et al.

(Continued)

*Primary Examiner* — Gregory Sefcheck
*Assistant Examiner* — Joshua Smith
(74) *Attorney, Agent, or Firm* — Klarquist Sparkman, LLP

(57) ABSTRACT

Techniques and tools for encoding and decoding data values that are hierarchically organized are presented. For example, an encoder encodes data as a set that has a hierarchy of subsets with set symbols. In the encoding, the encoder evaluates the data values of the set and selectively encodes a symbol combination code that indicates the set symbols of multiple subsets of the set. Then, for each of the multiple subsets considered as a new set, the encoder selectively repeats the evaluating, selective encoding and selective repetition for the new set. In corresponding decoding, a decoder decodes data encoded as a set that has a hierarchy of subsets with set symbols. In some implementations, the encoding and decoding are adaptive and use a symbol alphabet with nested elements.

27 Claims, 24 Drawing Sheets

U.S. PATENT DOCUMENTS

| | | | |
|---|---|---|---|
| 5,376,968 A | 12/1994 | Wu et al. |
| 5,381,144 A | 1/1995 | Wilson et al. |
| 5,394,170 A | 2/1995 | Akeley et al. |
| 5,400,075 A | 3/1995 | Savatier |
| 5,408,234 A | 4/1995 | Chu |
| 5,457,495 A | 10/1995 | Hartung |
| 5,461,421 A | 10/1995 | Moon |
| 5,467,134 A | 11/1995 | Laney |
| 5,481,553 A | 1/1996 | Suzuki |
| 5,493,407 A | 2/1996 | Takahara |
| 5,504,591 A | 4/1996 | Dujari |
| 5,508,816 A | 4/1996 | Ueda et al. |
| 5,533,140 A | 7/1996 | Sirat et al. |
| 5,535,305 A | 7/1996 | Acero et al. |
| 5,544,286 A | 8/1996 | Laney |
| 5,559,557 A | 9/1996 | Kato et al. |
| 5,568,167 A | 10/1996 | Galbi et al. |
| 5,574,449 A | 11/1996 | Golin |
| 5,579,430 A | 11/1996 | Grill et al. |
| 5,592,584 A | 1/1997 | Ferreira et al. |
| 5,627,938 A | 5/1997 | Johnston |
| 5,654,706 A | 8/1997 | Jeong et al. |
| 5,661,755 A | 8/1997 | Van de Kerkhof |
| 5,664,057 A | 9/1997 | Crossman et al. |
| 5,675,332 A | 10/1997 | Limberg |
| 5,714,950 A | 2/1998 | Jeong et al. |
| 5,717,821 A | 2/1998 | Tsutsui |
| 5,732,156 A | 3/1998 | Watanabe et al. |
| 5,734,340 A | 3/1998 | Kennedy |
| 5,748,789 A | 5/1998 | Lee et al. |
| 5,793,897 A | 8/1998 | Jo et al. |
| 5,801,648 A | 9/1998 | Satoh et al. |
| 5,802,213 A | 9/1998 | Gardos |
| 5,812,971 A | 9/1998 | Herre |
| 5,819,215 A | 10/1998 | Dobson et al. |
| 5,825,830 A | 10/1998 | Kopf |
| 5,825,979 A | 10/1998 | Tsutsui et al. |
| 5,828,426 A | 10/1998 | Yu |
| 5,831,559 A | 11/1998 | Agarwal et al. |
| 5,835,030 A | 11/1998 | Tsutsui et al. |
| 5,835,144 A | 11/1998 | Matsumura |
| 5,844,508 A | 12/1998 | Murashita et al. |
| 5,850,482 A | 12/1998 | Meany et al. |
| 5,883,633 A | 3/1999 | Gill et al. |
| 5,884,269 A | 3/1999 | Cellier et al. |
| 5,889,891 A | 3/1999 | Gersho et al. |
| 5,903,231 A | 5/1999 | Emelko |
| 5,946,043 A | 8/1999 | Lee et al. |
| 5,969,650 A | 10/1999 | Wilson et al. |
| 5,974,184 A | 10/1999 | Eifrig et al. |
| 5,974,380 A | 10/1999 | Smyth et al. |
| 5,982,437 A | 11/1999 | Okazaki |
| 5,983,172 A | 11/1999 | Takashima et al. |
| 5,990,960 A | 11/1999 | Murakami |
| 5,991,451 A | 11/1999 | Keith et al. |
| 5,995,670 A | 11/1999 | Zabinsky |
| 6,002,439 A | 12/1999 | Murakami |
| 6,009,387 A | 12/1999 | Ramaswamy et al. |
| 6,026,195 A | 2/2000 | Eifrig et al. |
| 6,038,536 A | 3/2000 | Haroun et al. |
| 6,041,302 A | 3/2000 | Bruekers |
| 6,049,630 A | 4/2000 | Wang et al. |
| 6,054,943 A | 4/2000 | Lawrence |
| 6,078,691 A | 6/2000 | Luttmer |
| 6,097,759 A | 8/2000 | Murakami |
| 6,097,880 A | 8/2000 | Koyata |
| 6,100,825 A | 8/2000 | Sedluk |
| 6,111,914 A | 8/2000 | Bist |
| 6,140,944 A | 10/2000 | Toyoyama |
| 6,148,109 A | 11/2000 | Boon |
| 6,154,572 A | 11/2000 | Chaddha |
| 6,195,465 B1 | 2/2001 | Zandi et al. |
| 6,205,256 B1 | 3/2001 | Chaddha |
| 6,208,274 B1 | 3/2001 | Taori et al. |
| 6,215,910 B1 | 4/2001 | Chaddha |
| 6,223,162 B1 | 4/2001 | Chen |
| 6,226,407 B1 | 5/2001 | Zabih et al. |
| 6,233,017 B1 | 5/2001 | Chaddha |
| 6,233,359 B1 | 5/2001 | Ratnakar et al. |
| 6,253,165 B1 | 6/2001 | Malvar |
| 6,259,810 B1 | 7/2001 | Gill et al. |
| 6,272,175 B1 | 8/2001 | Sriram et al. |
| 6,292,588 B1 | 9/2001 | Shen |
| 6,300,888 B1 | 10/2001 | Chen |
| 6,304,928 B1 | 10/2001 | Mairs et al. |
| 6,337,881 B1 | 1/2002 | Chaddha |
| 6,341,165 B1 | 1/2002 | Gbur |
| 6,345,123 B1 | 2/2002 | Boon |
| 6,349,152 B1 | 2/2002 | Chaddha |
| 6,360,019 B1 | 3/2002 | Chaddha |
| 6,373,412 B1 | 4/2002 | Mitchell |
| 6,377,930 B1 | 4/2002 | Chen |
| 6,392,705 B1 | 5/2002 | Chaddha |
| 6,404,931 B1 | 6/2002 | Chen |
| 6,408,029 B1 | 6/2002 | McVeigh et al. |
| 6,420,980 B1 | 7/2002 | Ejima |
| 6,421,738 B1 | 7/2002 | Ratan et al. |
| 6,424,939 B1 | 7/2002 | Herre et al. |
| 6,441,755 B1 | 8/2002 | Dietz et al. |
| 6,477,280 B1 | 11/2002 | Malvar |
| 6,487,535 B1 | 11/2002 | Smyth et al. |
| 6,493,385 B1 | 12/2002 | Sekiguchi et al. |
| 6,542,631 B1 | 4/2003 | Ishikawa |
| 6,542,863 B1 | 4/2003 | Surucu |
| 6,567,781 B1 | 5/2003 | Lafe |
| 6,573,915 B1 | 6/2003 | Sivan et al. |
| 6,577,681 B1 | 6/2003 | Kimura |
| 6,580,834 B2 | 6/2003 | Li et al. |
| 6,587,057 B2 | 7/2003 | Scheuermann |
| 6,606,039 B2 | 8/2003 | Hirano |
| 6,608,935 B2 | 8/2003 | Nagumo et al. |
| 6,636,168 B2 | 10/2003 | Ohashi et al. |
| 6,646,578 B1 | 11/2003 | Au |
| 6,650,784 B2 | 11/2003 | Thyagarajan |
| 6,653,952 B2 | 11/2003 | Hayami et al. |
| 6,678,419 B1 | 1/2004 | Malvar |
| 6,704,360 B2 | 3/2004 | Haskell et al. |
| 6,721,700 B1 | 4/2004 | Yin |
| 6,728,317 B1 | 4/2004 | Demos |
| 6,735,339 B1 | 5/2004 | Ubale |
| 6,766,293 B1 | 7/2004 | Herre |
| 6,771,777 B1 | 8/2004 | Gbur |
| 6,795,584 B2 | 9/2004 | Karczewicz et al. |
| 6,825,847 B1 | 11/2004 | Molnar et al. |
| 6,829,299 B1 | 12/2004 | Chujoh et al. |
| 6,934,677 B2 | 8/2005 | Chen et al. |
| 6,954,157 B2 | 10/2005 | Kadono et al. |
| 7,016,547 B1 | 3/2006 | Smirnov |
| 7,043,088 B2 | 5/2006 | Chiu |
| 7,076,104 B1 | 7/2006 | Keith et al. |
| 7,107,212 B2 | 9/2006 | Van Der Vleuten et al. |
| 7,139,703 B2 | 11/2006 | Acero et al. |
| 7,143,030 B2 | 11/2006 | Chen et al. |
| 7,165,028 B2 | 1/2007 | Gong |
| 7,215,707 B2 | 5/2007 | Lee |
| 7,266,149 B2 | 9/2007 | Holcomb |
| 7,274,671 B2 * | 9/2007 | Hu ......................... 341/65 |
| 7,328,150 B2 | 2/2008 | Chen et al. |
| 7,433,824 B2 | 10/2008 | Mehrotra et al. |
| 7,454,076 B2 | 11/2008 | Chen et al. |
| 7,460,990 B2 | 12/2008 | Mehrotra et al. |
| 7,502,743 B2 | 3/2009 | Thumpudi et al. |
| 7,536,305 B2 | 5/2009 | Chen et al. |
| 7,546,240 B2 | 6/2009 | Mehrotra et al. |
| 7,562,021 B2 | 7/2009 | Mehrotra et al. |
| 7,599,840 B2 | 10/2009 | Mehrotra et al. |
| 7,630,882 B2 | 12/2009 | Mehrotra et al. |
| 7,684,981 B2 | 3/2010 | Thumpudi et al. |
| 7,693,709 B2 | 4/2010 | Thumpudi et al. |
| 7,756,350 B2 | 7/2010 | Vos et al. |
| 7,761,290 B2 | 7/2010 | Koishida et al. |
| 7,822,601 B2 | 10/2010 | Mehrotra et al. |
| 7,840,403 B2 | 11/2010 | Mehrotra et al. |
| 2002/0009145 A1 | 1/2002 | Natarajan et al. |
| 2002/0031185 A1 * | 3/2002 | Webb ...................... 375/240.23 |
| 2002/0111780 A1 | 8/2002 | Sy |
| 2002/0141422 A1 * | 10/2002 | Hu ........................... 370/408 |

| | | | |
|---|---|---|---|
| 2003/0006917 | A1 | 1/2003 | Ohashi et al. |
| 2003/0033143 | A1 | 2/2003 | Aronowitz |
| 2003/0085822 | A1 | 5/2003 | Scheuermann |
| 2003/0115055 | A1 | 6/2003 | Gong |
| 2003/0138150 | A1 | 7/2003 | Srinivasan |
| 2003/0156648 | A1 | 8/2003 | Holcomb et al. |
| 2003/0210163 | A1 | 11/2003 | Yang |
| 2004/0044521 | A1 | 3/2004 | Chen et al. |
| 2004/0044534 | A1 | 3/2004 | Chen et al. |
| 2004/0049379 | A1 | 3/2004 | Thumpudi et al. |
| 2004/0114810 | A1 | 6/2004 | Boliek |
| 2004/0136457 | A1 | 7/2004 | Funnell et al. |
| 2004/0184537 | A1 | 9/2004 | Geiger et al. |
| 2004/0196903 | A1* | 10/2004 | Kottke et al. ............ 375/240.03 |
| 2005/0015249 | A1 | 1/2005 | Mehrotra et al. |
| 2005/0021317 | A1 | 1/2005 | Weng et al. |
| 2005/0052294 | A1 | 3/2005 | Liang et al. |
| 2005/0286634 | A1* | 12/2005 | Duvivier ................. 375/240.16 |
| 2006/0023792 | A1* | 2/2006 | Cho et al. ................ 375/240.24 |
| 2006/0078208 | A1 | 4/2006 | Malvar |
| 2006/0088222 | A1 | 4/2006 | Han et al. |
| 2006/0104348 | A1* | 5/2006 | Chen et al. .............. 375/240.01 |
| 2006/0153304 | A1* | 7/2006 | Prakash et al. ........... 375/240.25 |
| 2006/0176959 | A1* | 8/2006 | Lu et al. .................. 375/240.23 |
| 2006/0268990 | A1 | 11/2006 | Lin |
| 2006/0285760 | A1 | 12/2006 | Malvar |
| 2006/0290539 | A1* | 12/2006 | Tomic ............................ 341/50 |
| 2007/0116369 | A1 | 5/2007 | Zandi et al. |
| 2007/0126608 | A1 | 6/2007 | Sriram |
| 2007/0200737 | A1 | 8/2007 | Gao et al. |
| 2007/0242753 | A1 | 10/2007 | Jeon et al. |
| 2008/0043030 | A1 | 2/2008 | Huang et al. |
| 2008/0089421 | A1 | 4/2008 | Chang et al. |
| 2008/0262855 | A1 | 10/2008 | Mehrotra et al. |
| 2008/0317364 | A1* | 12/2008 | Gou et al. ................ 375/240.24 |

FOREIGN PATENT DOCUMENTS

| | | |
|---|---|---|
| EP | 0 910 927 | 1/1998 |
| EP | 0 966 793 | 9/1998 |
| EP | 0 931 386 | 1/1999 |
| EP | 1 142 130 | 4/2003 |
| EP | 1 400 954 | 3/2004 |
| EP | 1 142 129 | 6/2004 |
| GB | 2 372 918 | 9/2002 |
| GB | 2 388 502 | 11/2003 |
| JP | 01-125028 | 5/1989 |
| JP | 03-108824 | 5/1991 |
| JP | 5-199422 | 6/1993 |
| JP | 5-292481 | 11/1993 |
| JP | 6-021830 | 1/1994 |
| JP | 6-217110 | 8/1994 |
| JP | 07-087331 | 3/1995 |
| JP | 07-273658 | 10/1995 |
| JP | 7-274171 | 10/1995 |
| JP | 08-116263 | 5/1996 |
| JP | 08-167852 | 6/1996 |
| JP | 08-190764 | 7/1996 |
| JP | 08-205169 | 8/1996 |
| JP | 08-237138 | 9/1996 |
| JP | 11-041573 | 2/1999 |
| JP | 2000-338998 | 12/2000 |
| JP | 2001-500640 | 1/2001 |
| JP | 2002-158589 | 5/2002 |
| JP | 2002 204170 | 7/2002 |
| WO | WO 88/01811 | 3/1988 |
| WO | WO 91/14340 | 9/1991 |
| WO | WO 98/00924 | 1/1998 |
| WO | WO 00/36752 | 6/2000 |
| WO | WO 00/36754 | 6/2000 |
| WO | WO 02/35849 | 5/2002 |

OTHER PUBLICATIONS

U.S. Appl. No. 60/488,710, filed Jul. 18, 2003, Srinivasan et al.
Advanced Television Systems Committee, "ATSC Standard: Digital Audio Compression (AC-3), Revision A," 140 pp. (1995).
Bell et al., "Text Compression," *Prentice Hall*, pp. 105-107 (Feb. 1990).
Bosi et al., "ISO/IEC MPEG-2 Advance Audio Coding," *J. Audio Eng. Soc.*, vol. 45, No. 10, pp. 789-812 (1997).
Brandenburg, "ASPEC Coding," *AES 10th International Conference*, pp. 81-90 (Sep. 1991).
Brandenburg et al., "ASPEC: Adaptive Spectral Entropy Coding of High Quality Music Signals," *Proc. AES*, 12 pp. (Feb. 1991).
Brandenburg, "OCF: Coding High Quality Audio with Data Rates of 64 kbit/sec," *Proc. AES*, 17 pp. (Mar. 1988).
Brandenburg, "High Quality Sound Coding at 2.5 Bits/Sample," *Proc. AES*, 15 pp. (Mar. 1988).
Brandenburg et al., "Low Bit Rate Codecs for Audio Signals: Implementations in Real Time," *Proc. AES*, 12 pp. (Nov. 1988).
Brandenburg et al., "Low Bit Rate Coding of High-quality Digital Audio: Algorithms and Evaluation of Quality," *Proc. AES*, pp. 201-209 (May 1989).
Brandenburg, "OCF—A New Coding Algorithm for High Quality Sound Signals," *Proc. ICASSP*, pp. 5.1.1-5.1.4 (May 1987).
Brandenburg et al, "Second Generation Perceptual Audio Coding: the Hybrid Coder," *AES Preprint*, 13 pp. (Mar. 1990).
Chiang et al., "A Radix-2 Non-Restoring 32-b/32-b Ring Divider with Asynchronous Control Scheme," Tamkang Journal of Science and Engineering, vol. 2, No. 1, pp. 37-43 (Apr. 1999).
Chung et al., "A Novel Memory-efficient Huffman Decoding Algorithm and its Implementation," Signal Processing 62, pp. 207-213 (1997).
Costa et al., "Efficient Run-Length Encoding of Binary Sources with Unknown Statistics", Technical Report No. MSR-TR-2003-95, pp. 1-10, Microsoft Research, Microsoft Corporation (Dec. 2003).
Cui et al., "A novel VLC based on second-run-level coding and dynamic truncation," *Proc. SPIE*, vol. 6077, pp. 607726-1 to 607726-9 (2006).
Davidson et al., "Still Image Coding Standard—JPEG," Helsinki University of Technology, 24 pages, downloaded from the World Wide Web (2004).
Davis, "The AC-3 Multichannel Coder," *Dolby Laboratories Inc.*, Audio Engineering Study, Inc., 6 pp. (Oct. 1993).
De Agostino et al., "Parallel Algorithms for Optimal Compression using Dictionaries with the Prefix Property," Proc. Data Compression Conference '92, *IEEE Computer Society Press*, pp. 52-62 (1992).
Del Bimbo, "Progettazione e Produzione Multimediale," Univ. degli Studi di Firenze, 51 pp., downloaded from the World Wide Web.
Duhamel et al., "A Fast Algorithm for the Implementation of Filter Banks Based on Time Domain Aliasing Cancellation," *Proc. Int'l Conf. Acous., Speech, and Sig. Process*, pp. 2209-2212 (May 1991).
Gailly, "comp.compression Frequently Asked Questions (part 1/3)," 64 pp., document marked Sep. 5, 1999 [Downloaded from the World Wide Web on Sep. 5, 2007].
Gersho et al., "Vector Quantization and Signal Compression," pp. 259-305 (1992).
Gibson et al., *Digital Compression for Multimedia*, "Chapter 2: Lossless Source Coding," Morgan Kaufmann Publishers, Inc., San Francisco, pp. 17-61 (1998).
Gibson et al., *Digital Compression for Multimedia*, "Chapter 7: Frequency Domain Coding," Morgan Kaufmann Publishers, Inc., pp. 227-262 (1998).
Gill et al., "Creating High-Quality Content with Microsoft Windows Media Encoder 7," 4 pp. (2000) [ Downloaded from the World Wide Web on May 1, 2002].
Hui et al., "Matsushita Algorithm for Coding of Moving Picture Information," ISO/IEC-JTC1/SC29/WG11, MPEG91/217, 76 pp. (Nov. 1991).
Ishii et al., "Parallel Variable Length Decoding with Inverse Quantization for Software MPEG-2 Decoders," IEEE Signal Processing Systems, pp. 500-509 (1997).
ISO/IEC, "ISO/IEC 11172-2, Information Technology—Coding of Moving Pictures and Associated Audio for Digital Storage Media at up to About 1.5 Mbit/s—Part 2: Video," 112 pp. (1993).
"ISO/IEC 11172-3, Information Technology—Coding of Moving Pictures and Associated Audio for Digital Storage Media at Up to Ab out 1.5 Mbit/s—Part 3: Audio," 154 pp. (1993).
"ISO/IEC 13818-7, Information Technology—Generic Coding of Moving Pictures and Associated Audio Information—Part 7: Advanced Audio Coding (AAC)," 174 pp. (1997).

ISO/IEC 14496-2, "Coding of Audio-Visual Object—Part 2: Visual," Third Edition, pp. 1-727 (Jun. 2004).

ISO/IEC, "JTC1/SC29/WG11 N2202, Information Technology—Coding of Audio-Visual Objects: Visual, ISO/IEC 14496-2," 329 pp. (1998).

ISO/IEC, "Lossless and Near-lossless Coding of Continuous Tone Still Images (JPEG-LS)," JTC1/SC29/WG1 FCD 14495, 79 pp. (1997).

ITU-T, "ITU-T Recommendation H.261, Video Codec for Audiovisual Services at p×64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

ITU-T Recommendation H.264, "Series H: Audiovisual and Multimedia Systems, Infrastructure of Audiovisual Services—Coding of Moving Video," International Telecommunication Union, pp. 1-262 (May 2003).

ITU-T Recommendation T.800, "Series T: Terminals for Telematic Services," International Telecommunication Union, pp. 1-194 (Aug. 2002).

Iwadare et al., "A 128 kb/s Hi-Fi Audio CODEC Based on Adaptive Transform Coding with Adaptive Block Size MDCT," *IEEE. J. Sel. Areas in Comm.*, pp. 138-144 (Jan. 1992).

Jeon et al., "Huffman Coding of DCT Coefficients Using Dynamic Codeword Assignment and Adaptive Codebook Selection," Signal Processing: Image Communication 12, pp. 253-262 (1998).

Jeong et al., "Adaptive Huffman Coding of 2-D DCT Coefficients for Image Sequence Compression," *Signal Processing: Image Communication*, vol. 7, 11 pp. (1995).

Johnston, "Perceptual Transform Coding of Wideband Stereo Signals," *Proc. ICASSP*, pp. 1993-1996 (May 1989).

Johnston, "Transform Coding of Audio Signals Using Perceptual Noise Criteria," *IEEE J. Sel. Areas in Comm.*, pp. 314-323 (Feb. 1988).

Joint Video Team (JVT) of ISO/IEC MPEG & ITU-T VCEG, "Joint Final Committee Draft (JFCD) of Joint Video Specification," JVT-D157, 207 pp. (Aug. 2002).

Joint Video Team (JVT) of ISO/IEC MPEG & ITU-T VCEG, "Draft ITU-T Recommendation and Final Draft International Standard of Joint Video Specification (ITU-T Rec. H.264, ISO/IEC 14496-10 AVC)," 253 pp. (May 2003).

Lakhani, "Optimal Humman Coding of DCT Blocks," IEEE Trans. on Circuits and Systems for Video Technology, vol. 14, No. 4, pp. 522-527 (2004).

Li et al., "Optimal Linear Interpolation Coding for Server-Based Computing," *Proc. IEEE Int'l Conf. on Communications*, 5 pp. (Apr.-May 2002).

Mahieux et al., "Transform Coding of Audio Signals at 64 kbits/sec," *Proc. Globecom*, pp. 405.2.1-405.2.5 (Nov. 1990).

Malvar, "Fast Progressive Image Coding without Wavelets", IEEE Data Compression Conference, Snowbird, Utah, 10 pp. (Mar. 2000).

Marpe et al., "Adaptive Codes for H.26L," ITU Study Group 16—Video Coding Experts Group—ISO/IEC MPEG & ITU-T VCEG (ISO/IEC JTC1/SC29/WG11 and ITU-T SG16 Q6), No. VCEG-L13, 7 pages, Jan. 8, 2001.

Matthias, "An Overview of Microsoft Windows Media Screen Technology," 3 pp. (2000) [Downloaded from the World Wide Web on May 1, 2002].

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Mook, "Next-Gen Windows Media Player Leaks to the Web," *BetaNews*, 18 pp. (Jul. 2002) [Downloaded from the World Wide Web on Mar. 16, 2004].

Murray et al., "JPEG compression," Encyclopedia of Graphics File Formats, 2nd Edition, Chapter 9, Section 6, 10 pp., downloaded from the World Wide Web (1996).

Najafzadeh-Azghandi, "Perceptual Coding of Narrowband Audio Signals," Thesis, 139 pp. (Apr. 2000).

Nelson, *The Data Compression Book*, "Huffman One Better: Arithmetic Coding," Chapter 5, pp. 123-165 (1992).

OPTX International, "OPTX Improves Technology-Based Training with Screen Watch™ 3.0. Versatile Screen Capture Software Adds High Color and Live Webcast Support," 1 p., document marked Feb. 15, 2001 [Downloaded from the World Wide Web on Sep. 22, 2005].

OPTX International, "OPTX International Marks One Year Anniversary of Screen Watch With Release of New 2.0 Version," 1 p., document marked May 16, 2000 [Downloaded from the World Wide Web on Sep. 22, 2005].

OPTX International, "New Screen Watch™ 4.0 Clikc and Stream™ Wizard from OPTX International Makes Workplace Communication Effortless," 1 p., document marked Sep. 24, 2001 [Downloaded from the World Wide Web on Sep. 22, 2005].

Palmer et al., "Shared Desktop: A Collaborative Tool for Sharing 3-D Applications Among Different Window Systems," *Digital Tech. Journal*, vol. 9, No. 3, pp. 42-49 (1997).

Princen et al., "Analysis/Synthesis Filter Bank Design Based on Time Domain Aliasing Cancellation," *IEEE Trans. ASSP*, pp. 1153-1161 (Oct. 1986).

Printouts of FTP directories from http://ftp3.itu.ch, 8 pp. [Downloaded from the World Wide Web on Sep. 20, 2005].

Reader, "History of MPEG Video Compression—Ver. 4.0," 99 pp., document marked Dec. 16, 2003.

Schaar-Mitrea et al., "Hybrid Compresion of Video with Graphics in DTV Communication Systems," *IEEE Trans. on Consumer Electronics*, pp. 1007-1017 (2000).

Schroder et al., "High Quality Digital Audio Encoding with 3.0 Bits/Semple using Adaptive Transform Coding," *Proc. 80th Conv. Aud. Eng. Soc.*, 8 pp. (Mar. 1986).

Shamoon et al., "A Rapidly Adaptive Lossless Compression Algorithm for High Fidelity Audio Coding," *IEEE Data Compression Conf.*, pp. 430-439 (Mar. 1994).

Sullivan et al., "The H.264/AVC Advanced Video Coding Standard: Overview and Introduction to the Fidelity Range Extensions," 21 pp. (Aug. 2004).

Techsmith Corporation, "Techsmith Camtasia Screen Recorder SDK," 2 pp. (2001).

Techsmith Corporation, "Camtasia Feature of the Week: Quick Capture," 2 pp., document dated Jan. 4, 2001 [Downloaded from the World Wide Web on May 9, 2002].

Techsmith Corporation, "Camtasia Screen Recorder SDK DLL API User Guide," Version 1.0, 66 pp. (2001).

Techsmith Corporation, "Camtasia v.3.0.1—README.TXT," 19 pp. (Jan. 2002).

Theile et al., "Low-Bit Rate Coding of High Quality Audio Signals," *Proc. AES*, 32 pp. (Mar. 1987).

Tu et al., "Context-Based Entropy Coding of Block Transform Coefficients for Image Compression," *IEEE Transactions on Image Processing*, vol. 11, No. 11, pp. 1271-1283 (Nov. 2002).

Wien et al., "16 Bit Adaptive Block Size Transforms," JVT-C107r1, 54 pp.

Wien, "Variable Block-Size Transforms for Hybrid Video Coding," Dissertation, 182 pp. (Feb. 2004).

* cited by examiner software 180 implementing encoding and/or decoding of hierarchically organized data values.

Figure 4

| 25 | 12 | 0 | 0 | 0 | 0 | 0 | 0 |
|---|---|---|---|---|---|---|---|
| 0 | -5 | 0 | 0 | 0 | 0 | 0 | 0 |
| 0 | 0 | 0 | 0 | 0 | 0 | 0 | 2 |
| 0 | 0 | 0 | 0 | 0 | 0 | -1 | 1 |
| 0 | 0 | 0 | 0 | 0 | 0 | -1 | 1 |
| 0 | 0 | 0 | 0 | 0 | 0 | 1 | 1 |
| 0 | 0 | 0 | 0 | 0 | 0 | 0 | 0 |
| 0 | 0 | 0 | 0 | 0 | 0 | 0 | 0 | transform coefficients 400

Figure 5A

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 | prior art zigzag scan order 500 reordering coefficients 400 according to scan order 1D series of transform coefficients 550

25, 12, 0(x2), -5, 0(x38), 2, -1, 0(x7), -1, 1, 1, 1, 0(x4), 1, EOB alternative scan order 510

1D series of transform coefficients 560 reordering coefficients 400 according to scan order 25, 12, 0, -5, 0(x25), 2, -1, 1, 0(x20), -1, 1, 1, 1, EOB alternative scan order 520

1D series of transform coefficients 570 reordering coefficients 400 according to scan order 25, 12, 0, -5, 0(x5), 2, -1, 1, -1, 1, 1, 1, EOB

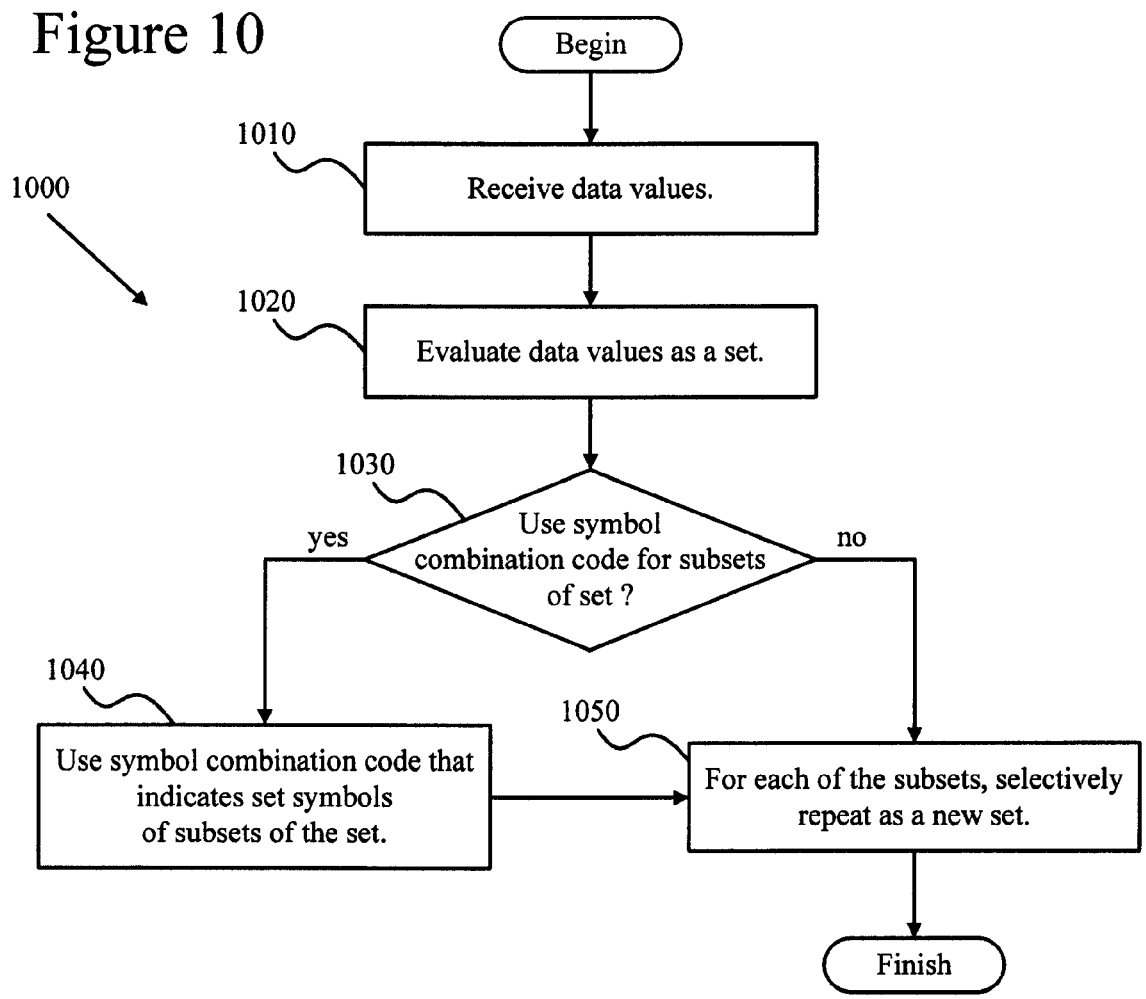

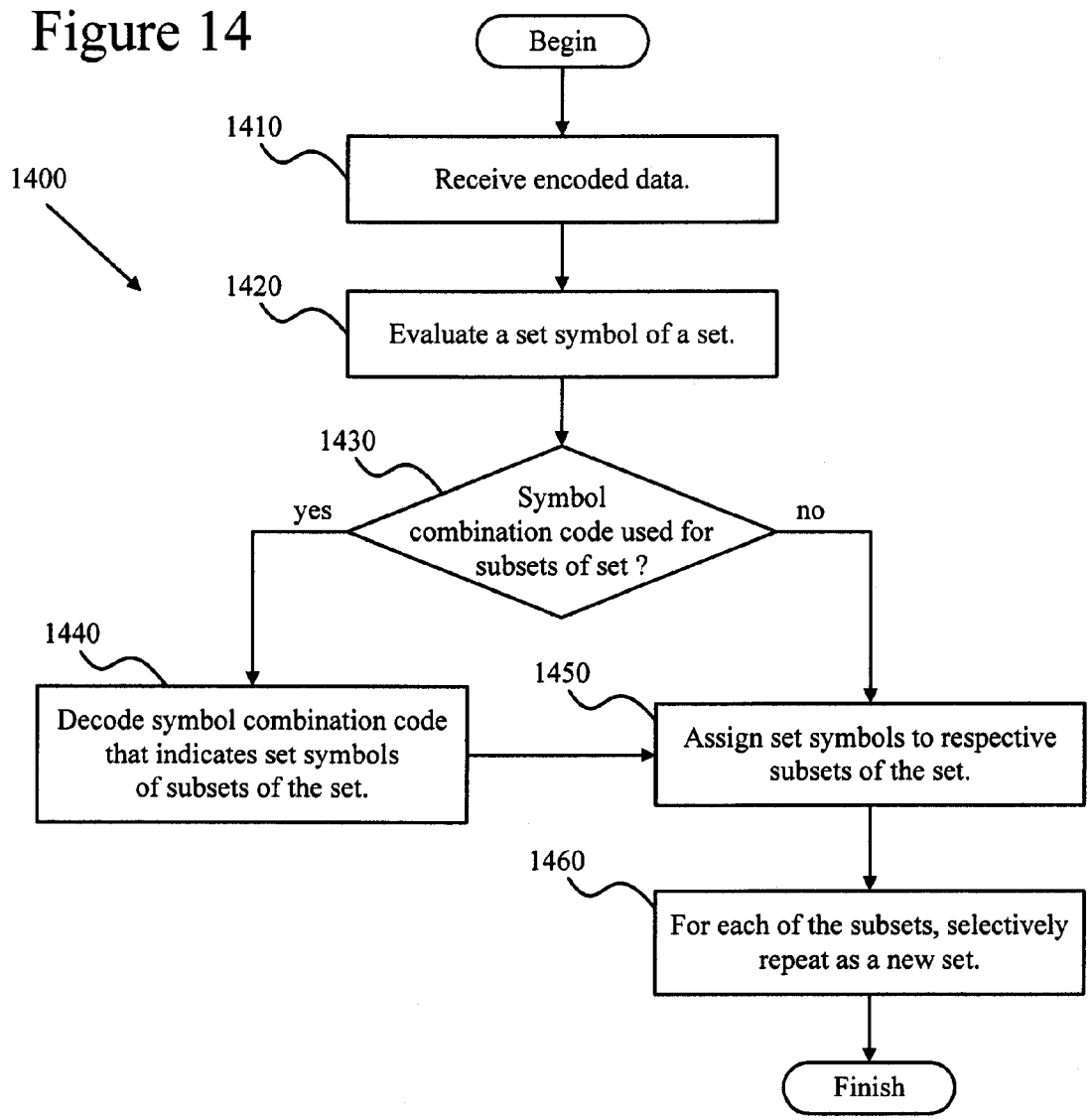

```
class AdaptiveHuffman3
{
   Occurrence[3];
   Symbol[3];

reset(){
      for(i = 0; i < 3; i ++){
         Occurrence[i] = 1;
         Symbol[i] = i;
      }
   } update(){
      while(Occurrence[Symbol[0]] > 256)
         for(i = 0; i < 3; i ++)
            Occurrence[i] >>= 1;
   } char decodeSymbol(){
      idx = 0;

if(readBit() == 1)
         idx = (readBit() == 0 ? 1 : 2);

Occurrence[Symbol[idx]] ++;   \\ update occurrence
      decoded_symbol = Symbol[idx];

// make sure Occurrence[Symbol[i - 1]] >= Occurrence[Symbol[i]]
      if(idx > 0 && Occurrence[Symbol[idx]] > Occurrence[Symbol[idx - 1]])
         SWAP(Symbol[idx], Symbol[idx – 1]);

return decoded_symbol;

```
class AdaptiveHuffman5
{
  Occurrence[5];
  Symbol[5];
  TableIdx;

reset(){
    TableIdx = 0;

for(i = 0; i < 5; i ++){
      Occurrence[i] = 1;
      Symbol[i] = i;
    }
  } update(){
    while(Occurrence[Symbol[0]] > 256)
      for(i = 0; i < 5; i ++)
        Occurrence[i] >>= 1;

// table selection logic
    MinCost = Cost = Occurrence[Symbol[0]]
                   + 2 * Occurrence[Symbol[1]]
                   + 3 * Occurrence[Symbol[2]]
                   + 4 * (Occurrence[Symbol[3]] + Occurrence[Symbol[4]]);
    TableIdx = 0;

Cost = Occurrence[Symbol[0]]
                   + 3 * (Occurrence[Symbol[1]] + Occurrence[Symbol[2]]
                   + Occurrence[Symbol[3]] + Occurrence[Symbol[4]]);
    if(Cost < MinCost)
      TableIdx = 1, MinCost = Cost;

Cost = 2 * (Occurrence[Symbol[0]] + Occurrence[Symbol[1]] + Occurrence[Symbol[2]])
                   + 3 * (Occurrence[Symbol[3]] + Occurrence[Symbol[4]]);
    if(Cost < MinCost)
      TableIdx = 2;
  }
```

```
char decodeSymbol(){
   idx = 0;

if(TableIdx == 0)
      while(readBit() == 1)
         idx ++;
   else if(TableIdx == 1)
      if(readBit() == 1)
         if(readBit() == 1)
            idx += 3 + readBit();
         else
            idx += 1 + readBit();
   else
      if(readBit() == 1)
         if(readBit() == 1)
            idx = 3 + readBit();
         else
            idx = 2;
      else
         idx = readBit();

Occurrence[Symbol[idx]] ++;
   decoded_symbol = Symbol[idx];

if(idx > 0 && Occurrence[Symbol[idx]] > Occurrence[Symbol[idx - 1]])
      SWAP(Symbol[idx], Symbol[idx – 1]);

return decoded_symbol;
   }
}
```

```
resetModels()
{
   for(i = 0; i < 54; i ++ ){
      AH3[i].reset();
      AH5[i].reset();
   }
}
```

```
updateModels()
{
   for(i = 0; i < 54; i ++ ){
      AH3[i].update();
      AH5[i].update();
   }
}
```

```
decodeMBCoeff(MBType)  \\ MBType is signaled somewhere else
{
   [YType, UVType] = decode2(MBType, 0);

[Tmp1, Tmp2] = decode2(YType, 1);

[BlkType[0], BlkType[1]] = decode2(Tmp2, 2);
   [BlkType[2], BlkType[3]] = decode2(Tmp1, 2);

if(YUV420)
      [BlkType[4], BlkType[5]] = decode2(UVType, 3);
   else{  \\ YUV422
      [Tmp1, Tmp2] = decode2(UVType, 3);

[BlkType[4], BlkType[5]] = decode2(Tmp2, 4);
      [BlkType[6], BlkType[7]] = decode2(Tmp1, 5);
   } for(blkIdx = 0; blkIdx < (YUV420 ? 6 : 8); blkIdx ++)
      decodeBlock(blkIdx, BlkType[blkIdx]);
}
```

```
[subtype1, subtype2] = decode2(type, context_idx)
{
   if(type == 0)
      subtype1 = subtype2 = 0;
   else if(type == 1){
      symbol_combo_index = AH3[context_idx].decodeSymbol();
      subtype1 = (symbol_combo_index+ 1) >> 1;
      subtype2 = ((symbol_combo_index+ 1) & 1);
   }
   else{
      a[5] = {2, 1, 0, 2, 2};
      b[5] = {2, 2, 2, 1, 0};

symbol_combo_index = AH5[context_idx].decodeSymbol();
      subtype1 = a[symbol_combo_index];
      subtype2 = b[symbol_combo_index];
   }
}
```

```
[subtype1, subtype2, subtype3] = decode3(type, context_idx)
{
   [subtype1, temp] = decode2(type, context_idx);
   [subtype2, subtype3] = decode2(temp, context_idx + 1);
}
```

```
[subtype1, subtype2, subtype3, subtype4] = decode4(type, context_idx)
{
   [subtype1, temp] = decode2(type, context_idx);
   [subtype2, subtype3, subtype4] = decode3(temp, context_idx + 1);
}
```

```
decodeBlock(blkIdx, blkType)
{
   ctxIdx = (blkIdx < 4 ? 6 : 30);

[Coeff[0], ACType] = decode2(BlkType, ctxIdx);

[TL[0], TL[1], TL[2]] = decode3(ACType, ctxIdx + 1);

[Coeff[1], Coeff[2], Coeff[3]] = decode3(TL[0], ctxIdx + 3);

[T2x2[1], T2x2[2], T2x2[3]] = decode3(TL[1], ctxIdx + 5);

[T4x4[1], T4x4[2], T4x4[3]] = decode3(TL[2], ctxIdx + 7);

for(i = 4; i < 16; i += 4)
      [T2x2[i], T2x2[i+1], T2x2[i+2], T2x2[i+3]] = decode4(T4x4[i/4], ctxIdx+6+ i/4*3);

for(i = 4; i < 64; i += 4)
      [Coeff[i], Coeff[i+1], Coeff[i+2], Coeff[i+3]] = decode4(T2x2[i/4], ctxIdx+(i < 4 ? 18 : 21));

// decode level
   for(i = 0; i < 64; i ++)
      if(Coeff[i] == 1){
         if(readBit() == 1)
            Coeff[i] = -1;
      }
      else if(Coeff[i] == 2){
         for(v = 0; v < 16; v ++)
            if(readBit() == 1)
               break;

if(v == 16){
            bits = 1;
            while(readBit() == 0)
               bits ++;
            v += readBits(bits) + (1 << bits) – 2;
         }

Coeff[i] = (readBit() == 1 ? -(v + 2) : v + 2);
      }
}
```

ENTROPY CODING/DECODING OF HIERARCHICALLY ORGANIZED DATA

BACKGROUND

When a picture such as a frame of video or a still image is encoded, an encoder typically splits the visual data into blocks of sample values. The encoder performs a frequency transform such as a discrete coefficient transform ("DCT") to convert the block of sample values (or motion-compensated prediction residual values) into a block of transform coefficients. The transform coefficient by convention shown at the upper left of the block is generally referred to as the DC coefficient, and the other coefficients are generally referred to as the AC coefficients. For most blocks of values, a frequency transform tends to group non-zero values of the transform coefficients towards the upper-left, lower frequency section of the block of transform coefficients.

After the frequency transform, the encoder quantizes the transform coefficient values. The quantization reduces the number of possible values for the DC and AC coefficients. This usually reduces fidelity of the quantized values to the original coefficient values, but it makes subsequent entropy encoding more effective. Quantization also tends to "remove" higher frequency coefficients (by convention shown the lower right side of the block), when the higher frequency coefficients have low levels that are quantized to zero.

After the transform coefficients have been quantized, the encoder entropy encodes the quantized transform coefficients. One common method of encoding a block of quantized transform coefficients starts by reordering the block using a zigzag scan order. The encoder maps the values of the transform coefficients from a two-dimensional array into a one-dimensional string according to the scan order. For example, the scan order begins in the top left of the block with the DC coefficient, traverses the lowest frequency AC coefficients of the block, and continues scanning along diagonal lines according to the scan order, finishing in the lower right corner of the block with the highest frequency AC coefficient. Quantization typically yields zero-value coefficients for a significant portion of the lower-value, higher-frequency coefficients, while preserving non-zero values for the higher-value, lower-frequency coefficients. Thus, zigzag scan reordering commonly results in most of the remaining non-zero transform coefficients being near the beginning of the one-dimensional string and a large number of zero values being at the end of the string.

The encoder then entropy encodes the one-dimensional string of coefficient values using run length coding or run level coding. In run level coding, the encoder traverses the one-dimensional string, encoding each run of consecutive zero values as a run count, and encoding each non-zero value as a level. The encoder can then assign variable length codes ("VLCs") to the run counts and level values.

In a simple variable length encoding scheme for the results of run-level coding, the encoder assigns a VLC to each run count and assigns a VLC to each level value. One problem with such simple variable length coding is that it fails to exploit correlation between run count values and level values. In many encoding scenarios, certain level values are correlated with certain run count values, and exploiting such correlation could lead to more efficient entropy coding.

In an example joint encoding scheme for the results of run-level coding, the encoder assigns a VLC to a run count and a subsequent non-zero level value. Although assigning VLCs to run count/level value pairs can help exploit correlation between run count and level values, the size of the run count/level value pair alphabet can be very large, which increases the complexity of the entropy encoding (e.g., due to codebook sizes and lookup operations). Using escape codes for less frequent run count/level value combinations helps control codebook size but can decrease coding efficiency.

Another problem with run-level coding arises when the encoder uses the same possible code values for run-level combinations regardless of which AC coefficients are being encoded. For example, if the likelihood of encountering a long run of zero values changes for different frequencies of AC coefficients, using the same possible code values for run-level combinations can hurt efficiency.

In corresponding decoding, a decoder decodes VLCs to determine run counts and level values, and then reconstructs a one-dimensional string of quantized transform coefficients from the run counts and level values. The decoder scans the one-dimensional series into a two-dimensional block, performs inverse quantization, and performs an inverse frequency transform to reconstruct the block of sample values (or motion-compensated prediction residuals).

Aside from these simple variations of run-level coding/decoding, many other variations of run-level coding/decoding have been used for entropy coding/decoding of quantized transform coefficients. Other encoders and decoders use a different form of entropy coding/decoding such as adaptive Huffman coding/decoding or arithmetic coding/decoding.

Given the critical importance of encoding and decoding to digital video, it is not surprising that video encoding and decoding are richly developed fields. Whatever the benefits of previous video encoding and decoding techniques, however, they do not have the advantages of the following techniques and tools.

SUMMARY

In summary, the detailed description presents techniques and tools for encoding and decoding data values that are hierarchically organized. These techniques and tools facilitate low complexity implementations of encoding and decoding that are also efficient in terms of rate-distortion performance in many common encoding/decoding scenarios.

According to a first aspect of the techniques and tools, an encoder encodes data as a set that has a hierarchy of subsets with set symbols. The encoder receives data values and encodes the data values as a set. In the encoding, the encoder evaluates the data values of the set and selectively encodes a symbol combination code that indicates the set symbols of multiple subsets of the set. For example, the encoder skips encoding the symbol combination code when each of the data values in the set is zero but otherwise performs the encoding of the symbol combination code. Then, for each of the multiple subsets considered as a new set, the encoder selectively repeats the evaluating, selective encoding and selective repetition for the new set. For example, for a given subset, the encoder repeats these operations when the subset has multiple data values.

During or after the encoding of symbol combination codes for a set of data values, the encoder can signal one or more value codes for each of the data values, to the extent the data value is not already implied by the set symbol of a subset that includes the data value. For example, in some implementations, if the set symbol of the subset that includes the data value is a first symbol element, the encoder signals no value codes for the data value since its value is implied by the set symbol. If the set symbol of the subset that includes the data value is a second symbol element, however, the encoder signals a sign bit that indicates whether the data value is 1 or −1. Otherwise, the encoder signals a value code and sign bit that indicate the data value.

According to a second aspect of the techniques and tools, a decoder decodes data encoded as a set that has a hierarchy of subsets with set symbols. The decoder receives encoded data and, using the encoded data, reconstructs data values encoded as a set. For the reconstructing, the decoder evaluates a set symbol of the set, selectively decodes a symbol combination code that indicates set symbols of multiple subsets of the set, and assigns the respective set symbols to the multiple subsets of the set. For example, the decoder skips the decoding the symbol combination code when the set symbol of the set is a first symbol element (which implies the set symbols of the respective subsets), but otherwise performs the decoding the symbol combination code. Then, for each of the multiple subsets considered as a new set, the decoder selectively repeats the reconstructing for the new set. For example, for each of the multiple subsets, the decoder repeats the reconstructing when the subset has multiple data values.

Some implementations use a symbol alphabet with nested elements. For example, a first element indicates that a set (or subset) includes only zero-value data values, and a second element indicates that each of the data values in a set (or subset) is −1, 0 or 1, with the set including at least one −1 or 1 value. A third element indicates that the set (or subset) includes at least one non-zero value with an absolute value greater than 1. Nesting symbol elements in the alphabet can help improve encoding/decoding performance.

The VLCs used as symbol combination codes depend on implementation. For example, a single VLC is used as a symbol combination code that represents set symbols for the multiple subsets of a set. When such VLCs represent combinations of set symbols from an alphabet with nested elements, codebook size can be reduced by eliminating certain symbol combinations in a codebook. For example, in some implementations, an encoder and decoder use a three-code codebook or a five-code codebook for symbol combination codes, depending on the set type of a set. Depending on implementation, an encoder/decoder can perform encoding/decoding with the three-code and five-code codebooks without large tables in memory, which simplifies computation and reduces resource requirements.

In adaptive variations of the encoding and decoding, an encoder and a decoder use one or more adaptive mechanisms to improve rate-distortion performance. For example, the encoder and decoder switch between codebooks depending on the history of occurrences of symbol combination codes, remap associations between VLCs and symbol combinations in a codebook depending on the history of occurrences of symbol combination codes and/or switch context models depending on the types or positions of data values being encoded/decoded.

For image and video encoding/decoding applications, the data values that are encoded and decoded can be quantized transform coefficients of blocks of sample values or blocks of residual values. Or, the data values can represent coded block pattern ("CBP") information for a macroblock. Or, the data values can represent some other syntax element or type of data.

The foregoing and other objects, features, and advantages of the invention will become more apparent from the following detailed description, which proceeds with reference to the accompanying figures. This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

FIG. 4 is a chart illustrating an example block of quantized transform coefficients.

FIGS. 5A, 5B and 5C show charts illustrating example scan orders and show the results of applying the respective scan orders to the block of transform coefficients from FIG. 4.

FIG. 10 is a flowchart illustrating a generalized technique for encoding data values in a set with a hierarchy of subsets.

FIG. 14 is a flowchart illustrating a generalized technique for decoding data values organized as a set with a hierarchy of subsets.

FIGS. 17, 18A, 18B, 19A, 19B, 20A, 20B, 20C, 21 and 22 are pseudocode example decoding routines according to an example combined implementation.

DETAILED DESCRIPTION

Figure 1:
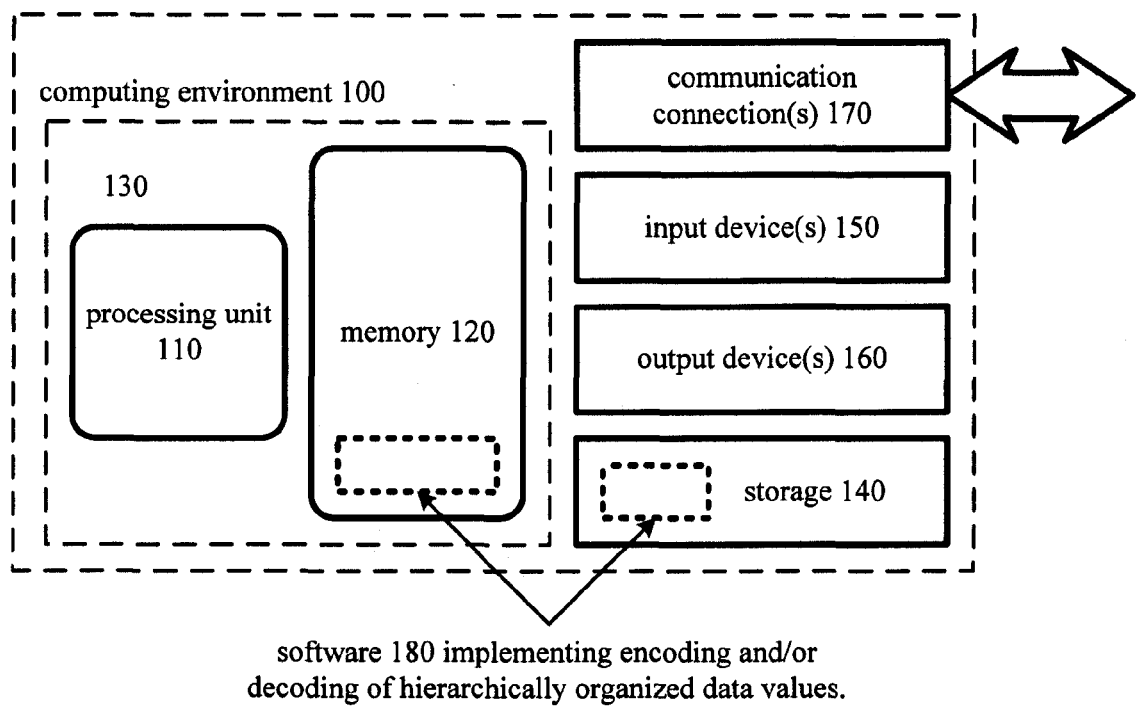
FIG. 1 is a block diagram of a suitable computing environment in which several described embodiments may be implemented.

The following detailed description presents tools and techniques for encoding data values such as quantized transform coefficients that are hierarchically organized. It also presents corresponding tools and techniques for decoding data values that are hierarchically organized.

For image and video encoding/decoding applications, the quantized transform coefficients of a block are organized as a set (having a set symbol) with subsets (having set symbols). When an encoder encodes the coefficients in a set, the encoder evaluates the coefficients. If each coefficient in the set is zero, a set symbol for the set implies that the values are zero and also implies the set symbols of subsets of the set. Otherwise, the encoder encodes a VLC that indicates the set symbols of the subsets of the set. Then, for each of the subsets of the set, the encoder selectively repeats the encoding for the subset. As the encoder encodes VLCs indicating set symbols for subsets for the set, or after the encoding of such VLCs, the encoder signals a sign bit and VLC to indicate each coefficient value when the value is not already implied by a set symbol.

When a corresponding decoder reconstructs the quantized transform coefficients, the decoder evaluates the set symbol of a set. If the set symbol is zero, the decoder assigns the set symbols of subsets of the set. Otherwise, the decoder variable length decodes a VLC that indicates the set symbols of the subsets and assigns the set symbols to the subsets. Then, for each of the subsets, the decoder repeats the reconstruction for the subset if the subset has multiple coefficient values. As the decoder decodes VLCs indicating set symbols for subsets for the set, or after the decoding of such VLCs, the decoder decodes s a sign bit and VLC to indicate each coefficient value, to the extent the value is not already implied by a set symbol.

One advantage of set/subset encoding and decoding is the simplicity of the encoding and decoding logic. Another advantage of example implementations described herein is compression efficiency when encoding data values that are predominantly zero values, with a small number of data values of 1 or −1, and even fewer data values having absolute value more than 1. In particular, this pattern of probability distribution is common for quantized transform coefficients of blocks of inter-layer residual video in scalable coding/decoding applications.

In adaptive variations, entropy coding and decoding can be made adaptive by adjusting the mappings between VLCs and set symbol combinations in a codebook, by using different context models for different types or positions of data values being encoded and decoded, and/or by selecting between multiple available codebooks. By adapting to the data values being encoded and decoded, compression efficiency can be improved.

Some variations of the encoding/decoding limit codebook size in view of constraints indicated by a set symbol of a set and a small alphabet A of symbol elements. For example, if the set symbol of the set is A0, the data values in the set are zero. On the other hand, if the set symbol of the set is A1, each of the data values in the set is −1, 0 or 1, and at least one of the data values in the set has a value of 1 or −1. When the set symbol is A1, the codebook that indicates possible set symbol combinations for subsets addresses the three combinations A1-A1, A1-A0 and A0-A1, but not the combination A0-A0. (If A0-A0 were the combination then the set symbol of the set would have been A0 not A1.) If the set symbol of the set is A2, at least one of the data values in the set has absolute value greater than 1. The codebook that indicates possible set symbol combinations for subsets addresses the five combinations A2-A2, A2-A1, A2-A0, A1-A2 and A0-A2, but not the three combinations from the A1 codebook and not the combination A0-A0. Limiting codebook size in this way can reduce resource utilization (especially when multiple codebooks and context models are used) and can also increase the speed of lookup operations during encoding and decoding.

Some of the techniques and tools described herein address one or more of the problems noted in the background. Typically, a given technique/tool does not solve all such problems. Rather, in view of constraints and tradeoffs in encoding time, encoding resources, decoding time, decoding resources and/or quality, the given technique/tool improves encoding and/or decoding performance for a particular implementation or scenario.

I. Computing Environment

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing an encoder and/or decoder with one or more of the described techniques and tools for encoding and/or decoding hierarchically organized data values.

A computing environment may have additional features. For example, the computing environment (100) includes storage (340), one or more input devices (150), one or more output devices (160), and one or more communication connections (170). An interconnection mechanism not shown such as a bus, controller, or network interconnects the components of the computing environment (100). Typically, operating system software not shown provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing the encoder and/or decoder.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine" and "reconstruct" to describe computer operations in a computing environment. These terms are high-level abstractions for operations performed by a computer, and should not be confused with acts performed by a human being. The actual computer operations corresponding to these terms vary depending on implementation.

II. A Generalized Encoder for Encoding Data Values Hierarchically

Figure 2:
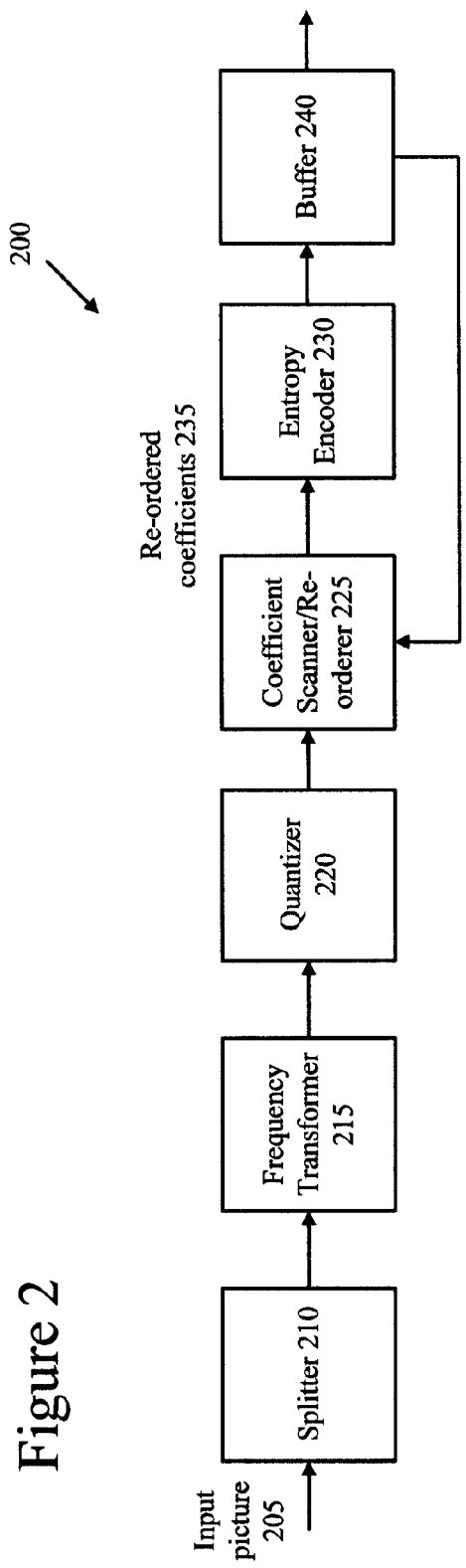
FIG. 2 is a block diagram of a generalized encoder operable to encode quantized transform coefficients or other data values that are organized hierarchically as sets with subsets.

FIG. 2 illustrates a block diagram of a generalized encoder (200) in which embodiments of this disclosure can be implemented. The encoder (200) receives an input picture (205) in a sequence. The term picture generally refers to source, coded, or reconstructed image data. For progressive video, a picture is a progressive video frame. For interlaced video, a picture may refer to an interlaced video frame, the top field of the frame, or the bottom field of the frame, depending on context. The input picture (205) can be a whole frame of video or a static picture, or the input picture can be just a portion of a frame of video or a portion of a static picture. Alternatively, the input picture (205) can comprise only one color component of a picture, for example, the luma component of a YUV picture. For scalable encoding/decoding applications, the input picture (205) can be a residual that indicates differences between original video and reconstructed base layer video.

For the sake of simplicity, FIG. 2 does not show modules of the encoder (200) that relate to motion estimation, motion compensation, and other motion processing. For video encoding applications, in addition to processing blocks of sample values for intra-picture compression, the encoder (200) can process blocks of values of motion-compensation residuals using the modules shown in FIG. 2. For a given residual block, the encoder performs a frequency transform, quantization, scan reordering and entropy encoding of the frequency coefficient values of the residual block.

In FIG. 2, for intra-picture compression, a splitter (210) splits the input picture (205) into a series of blocks each containing a plurality of sample values. For an 8×8 block, each block comprises 64 sample values arranged in eight rows and eight columns. Alternatively, the blocks can be 4×4, 4×8, 8×4, 16×16, or some other size.

A frequency transformer (215) converts the blocks of sample values into frequency domain (i.e., spectral, transform) data. The frequency transformer (215) applies a DCT, variant of DCT, or other frequency transform to the blocks of sample values, producing blocks of frequency transform coefficients. The frequency transformer (215) may apply an 8×8, 8×4, 4×8, 4×4 or other size frequency transform.

A quantizer (220) then quantizes the blocks of transform coefficients. The quantizer (220) applies non-uniform, scalar quantization to the spectral data with a step size that varies on a picture-by-picture basis, block-by-block basis, or other basis. The quantizer (220) can also apply another type of quantization to the spectral data coefficients, for example, a uniform or adaptive quantization for at least some of the coefficients, or directly quantizes spatial domain data in an encoder system that does not use frequency transformations.

A coefficient scanner/re-orderer (225) scans the quantized coefficients and re-orders them in a one-dimensional string according to a scan order. In some implementations, as described in U.S. patent application Ser. No. 12/151,069, the encoder (200) uses any of multiple scan orders available to the coefficient scanner (225). For example, the encoder (200) switches between the scan order (500) in FIG. 5A, the scan order (510) in FIG. 5B, the scan order (520) in FIG. 5C, and one or more other scan orders. By selectively using different scan orders the encoder (200) can often improve the compression efficiency of subsequent entropy encoding.

An entropy encoder (230) encodes the coefficients in the one-dimensional string. For example, the entropy encoder (230) encodes symbols for the transform coefficients using a variation of adaptive Huffman coding, non-adaptive Huffman coding, or other variable length coding as described below. In some implementations, the encoder (200) can switch between multiple ways of partitioning blocks of transform coefficients into nested set representations, as described in U.S. patent application Ser. No. 12/151,069. For example, the encoder (200) switches between the partitioning schemes shown in FIGS. 6A, 6B and 6C. The entropy encoder (230) can encode transform coefficients partitioned in this way or organized hierarchically in some other way. In adaptive variations, the entropy encoder (230) can adapt the entropy encoding to different types or positions of transform coefficients being encoded within a given block and/or to changes in probability distributions of coefficients values over time. In some implementations, the entropy encoder (230) uses a symbol alphabet with nested elements, which helps limit the size of the codebooks used in entropy coding and decoding. After encoding, the entropy encoder (230) outputs the entropy encoded coefficient values (235) to a buffer (240).

III. A Generalized Decoder for Decoding Hierarchically Organized Data Values

Figure 3:
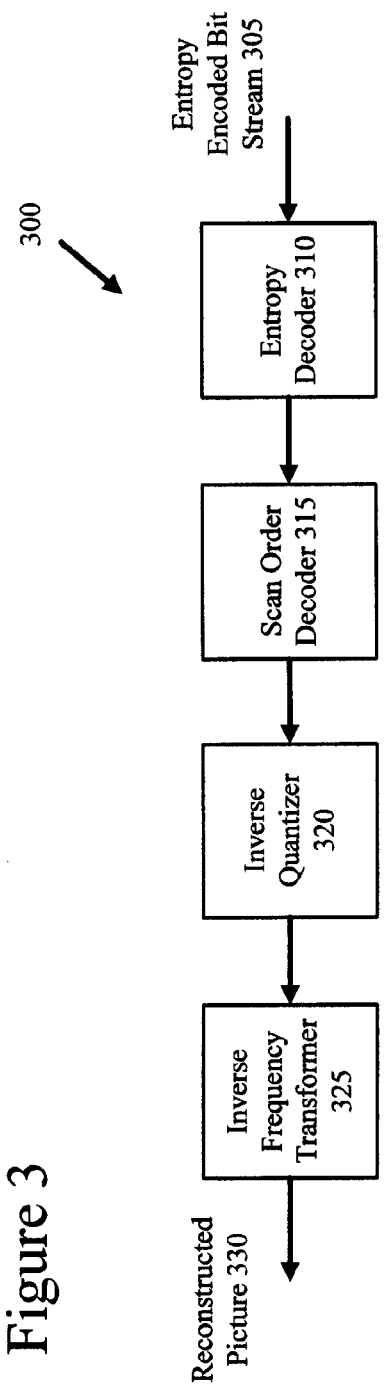
FIG. 3 is a block diagram of a generalized decoder operable to decode quantized transform coefficients or other data values that are organized hierarchically as sets with subsets.

FIG. 3 shows a block diagram of a generalized decoder (300) adapted to decode hierarchically organized data values. The decoder (300) could be used, for example, to decode the output of the encoder (200) shown in FIG. 2.

For the sake of simplicity, FIG. 3 does not show modules of the decoder (300) that relate to motion compensation and other motion processing. For video decoding applications, in addition to processing blocks of sample values for intra-picture decompression, the decoder (300) can process blocks of values of motion-compensation residuals using the modules shown in FIG. 3. For a given residual block, the decoder performs entropy decoding of the frequency coefficient values of the residual block, scan reordering, inverse quantization and an inverse frequency transform.

The decoder (300) receives an entropy encoded bit stream (305) and an entropy decoder (310) decodes the bit stream (305) to produce one or more symbols. The entropy decoder (310) can perform adaptive Huffman decoding, non-adaptive Huffman decoding, or other variable length decoding. The entropy decoder (310) can adapt the entropy decoding to different types or positions transform coefficients being decoded within a given block and/or to changes in probability distributions of coefficients values over time. In some implementations, the entropy decoder (310) uses a symbol alphabet with nested elements.

The symbols decoded by the entropy decoder (310) indicate the relative positions and values of transform coefficients in subsets in a multi-level nested set representation (as shown, for example, in FIG. 6A, 6B or 6C) or other hierarchical organization. The decoder (300) arranges the plural frequency coefficients into a one-dimensional string according to the coefficient positions indicated.

A scan order decoder (315) arranges the coefficients in a block according to a scan order. The decoder (300) can use a selected one of multiple scan orders available to the scan order decoder (315). For example, the decoder (300) switches between the scan order (500) in FIG. 5A, the scan order (510) in FIG. 5B, the scan order (520) in FIG. 5C, and one or more other scan orders.

An inverse quantizer (320) inverse quantizes the transform coefficients. The inverse quantizer (320) may reverse adaptive spectral quantization or direct quantization. An inverse frequency transformer (325) performs an inverse frequency transform on the plural frequency coefficients to produce a block of values for a picture. The inverse frequency transformer (325) may apply an 8×8, 8×4, 4×8, 4×4 or other size inverse frequency transform. The decoder (300) then outputs the reconstructed block as part of a reconstructed picture (330).

IV. Example Scan Orders and Multi-Level Nested Set Representations

The entropy coding and decoding techniques and tools described herein can be applied to blocks of quantized transform coefficients in image and video coding/decoding applications. For the sake of illustration, this section describes an example block of quantized transform coefficients, example scan patterns and example multi-level nested set partitioning schemes. More generally, an encoder and decoder apply one or more of the entropy encoding and decoding techniques to other data values that are hierarchically organized.

FIG. 4 shows one example of an 8×8 block (400) of transform coefficients after quantization. In this example block (400), the value 25 in the upper left corner of the block is the DC coefficient, and the other 63 values are the AC coefficients. Although the highest-level coefficients in the block (400) are the low frequency coefficients in the upper left, along its right side the block includes a cluster of non-zero coefficient values at higher frequencies.

FIG. 5A shows a "zigzag" scan order (500). When an encoder uses the scan order (500), the encoder maps the values of the transform coefficients from a two-dimensional array into a one-dimensional string according to the scan order (500). The scan order (500) begins in the top left of the block (400) with the DC coefficient, traverses the AC coefficients of the block (400) at positions 1 and 2, traverses the AC coefficients at positions 3, 4, and 5, and so on. The scanning continues along diagonal lines across the block (400) according to the scan order (500), finishing in the lower right corner of the block (400) with the highest frequency AC coefficient at position 63. FIG. 5A also shows a one-dimensional string (550) that results from applying the scan order (500) to the block (400) of transform coefficients. In this example, the one-dimensional string (550) starts with the value 25 corresponding to the DC coefficient of the block (400). The scan order then reads the value 12, followed by two values of 0, a value of −52, and so on. The symbol "EOB" signifies "End of Block" and indicates that all of the remaining values in the block are 0.

Figure 5B:
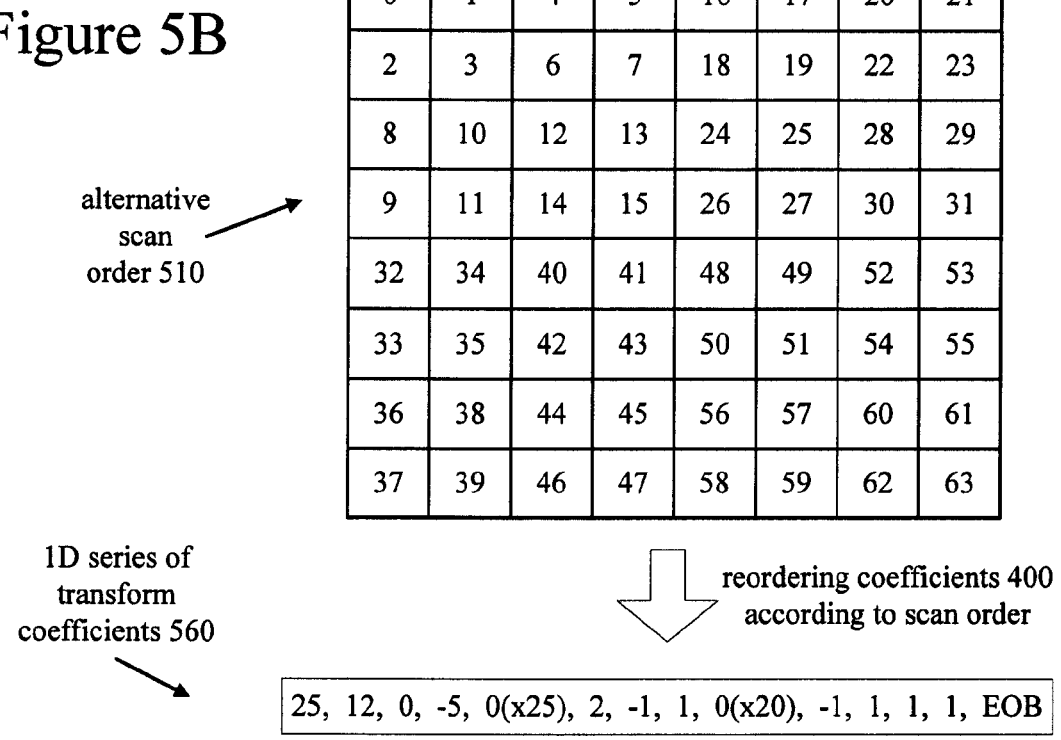
Figure 5C:
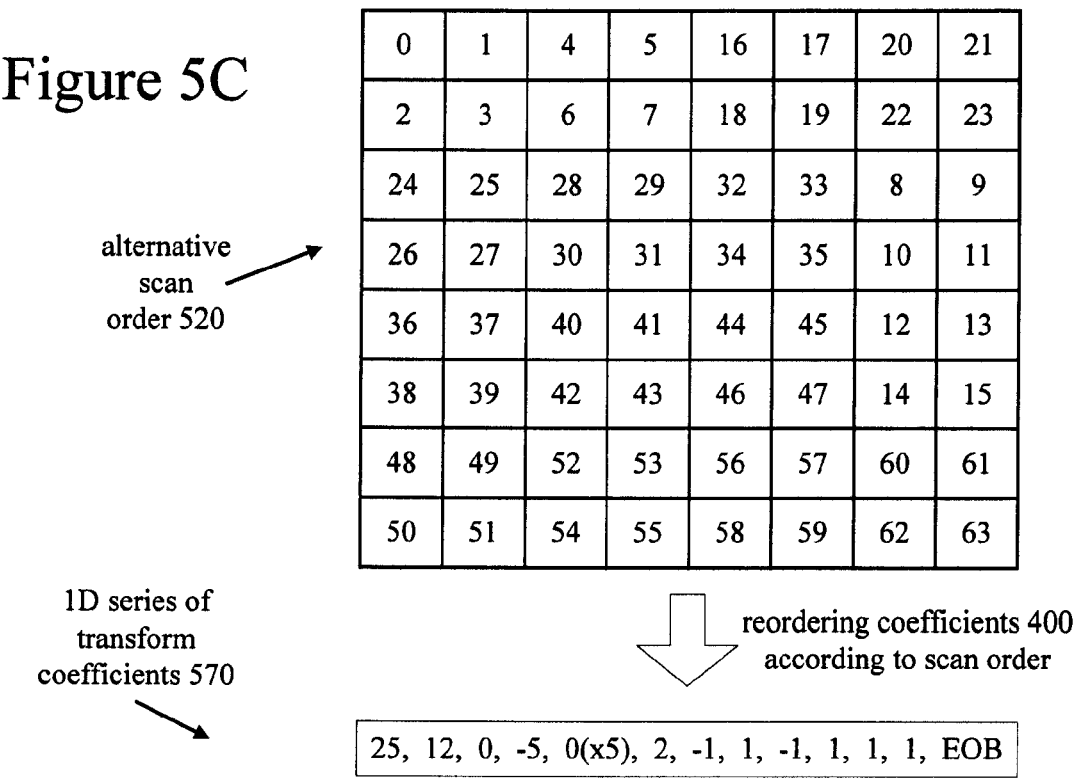

FIGS. 5B and 5C show two other scan orders. Alternatively, an encoder and decoder use other and/or additional scan orders. FIGS. 5B and 5C also show the results of applying the respective scan orders (510, 520) to the frequency coefficients (400) that are shown in FIG. 4. The one-dimensional string (560) produced by applying the scan order (510) is slightly more efficient (in terms of clustering of non-zero values) than the one-dimensional string (550) produced by reordering according to the zigzag pattern (500) of FIG. 5A. With respect to FIG. 5C, the one-dimensional string (570) resulting from application of the scan order of FIG. 5C is significantly more compact for this particular block (400).

Using a multi-level nested set representation for transform coefficients can facilitate efficient entropy encoding of the transform coefficients by using a summary representation of zero-value transform coefficients. Multi-level nested set representations are particularly effective when used in combination with adaptive scan order selection, but they can also be used with non-adaptive scan reordering. In a typical 8×8 block of transform coefficients (after quantization), most of the non-zero coefficient values are clustered in a few areas, such as the top left corner for low frequency coefficients. An effective multi-level nested set representation groups zero-value high-frequency coefficients together as a single block and represents them as a single zero-value coefficient (or symbol). Aside from grouping zero-value coefficients into a block or blocks in this way, the multi-level nested set representation groups a subset of coefficients that include non-zero values (or a mix of non-zero values and zero values) as a single block and treats them as one coefficient (or symbol). At a given level, the multi-level nested set representation includes one or more "summary" coefficients (or symbols), which are then entropy encoded. For a block that includes one or more non-zero value coefficients, the multi-level nested set representation recursively splits the coefficients into subgroups that are represented as single coefficients (or symbols) for encoding.

Figure 6A:
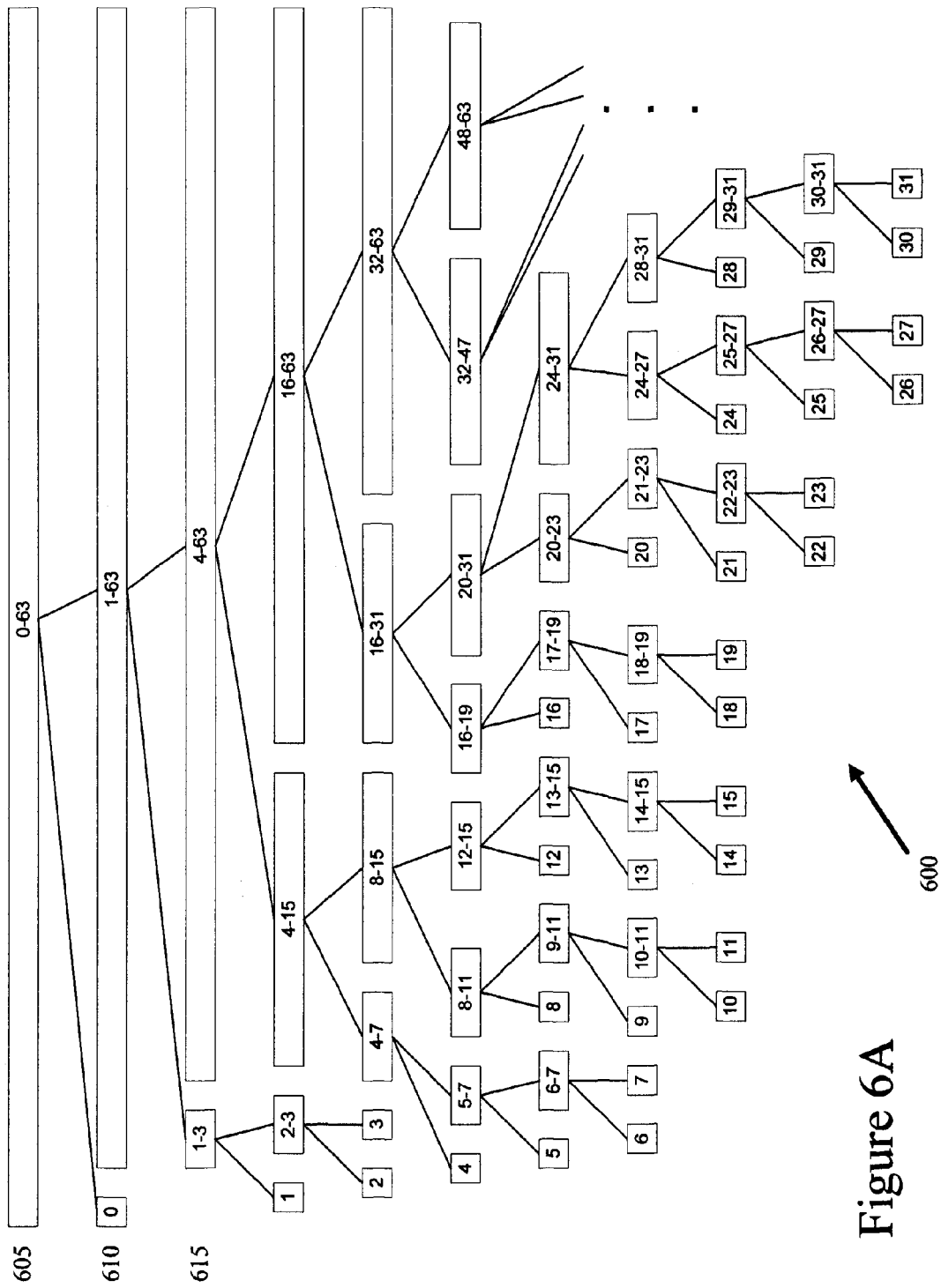
FIGS. 6A, 6B and 6C are diagrams of example multi-level nested set representations.
Figure 6B:
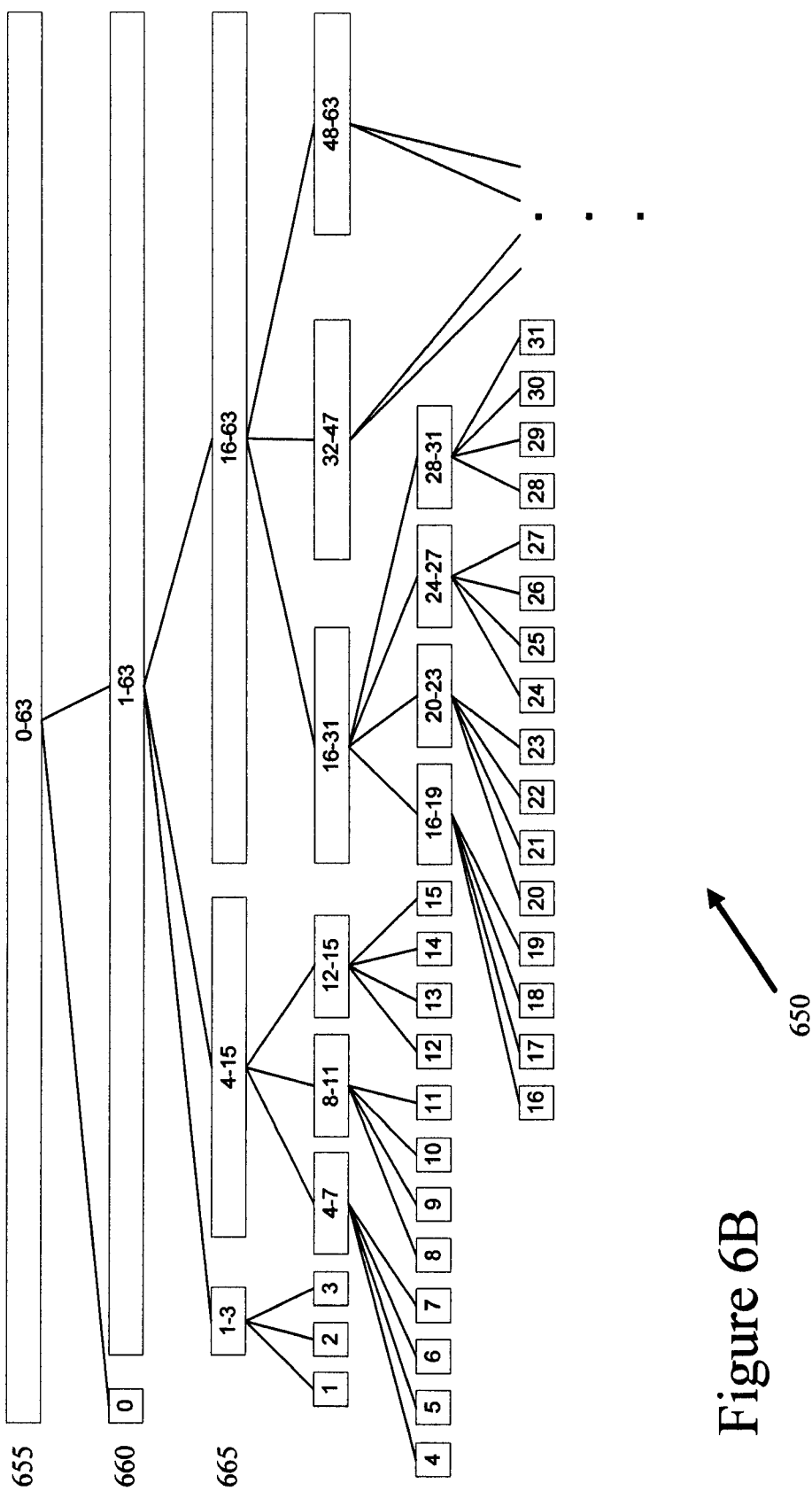
Figure 6C:
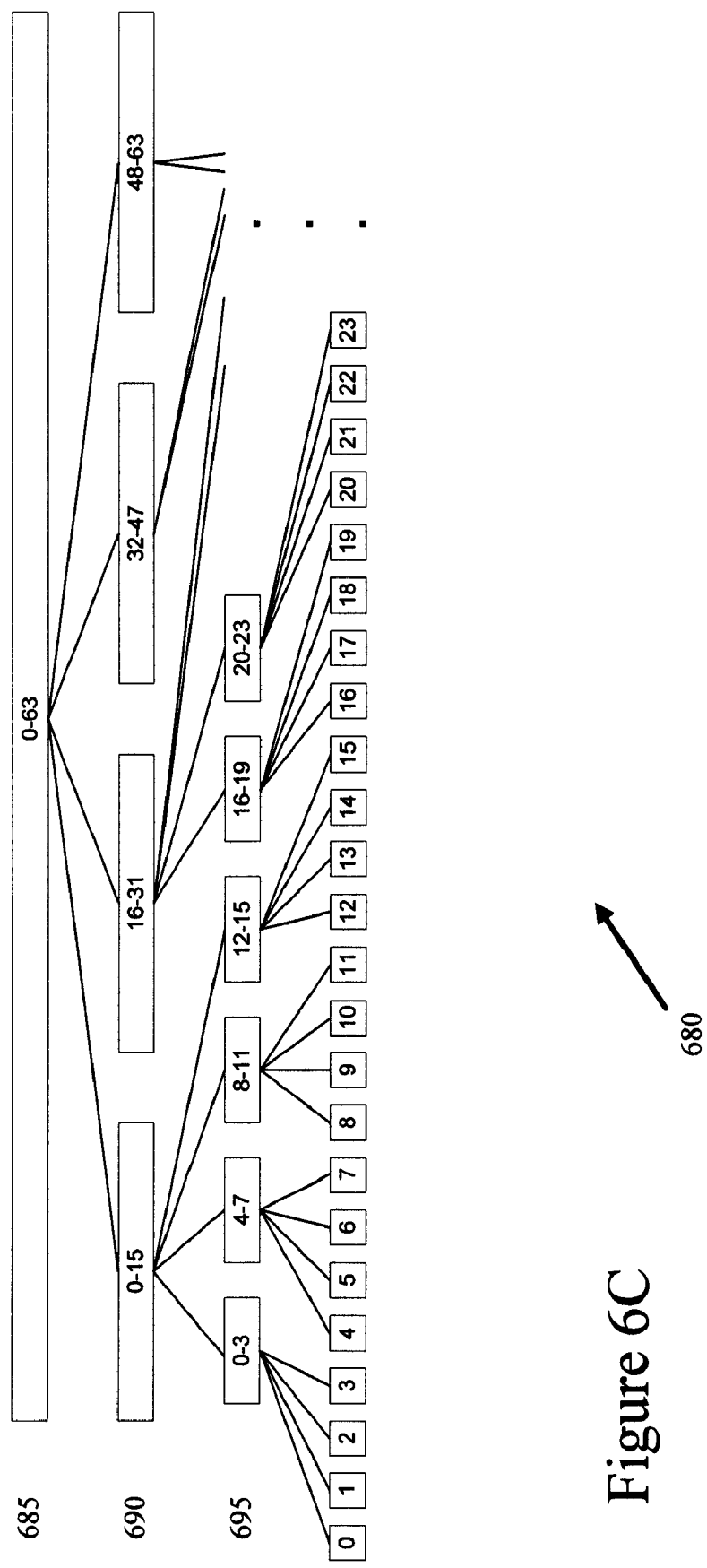

FIGS. 6A, 6B, and 6C illustrate example multi-level nested set representations (600, 650, 680) for a block with 64 coefficients. Alternatively, an encoder and decoder use other and/or additional multi-level nested set representations. With reference to FIG. 6A, when a set is split into n subsets, n is equal to 2. In the representation (650) shown in FIG. 6B, n is equal to 2, 3 or 4, and in the representation (680) shown in FIG. 6C, n is equal to 4. Alternatively, n could be equal to some other number.

In FIG. 6A, the coefficient values at positions 0 through 63 represent a first set at a first level (605) and are split into a first subset at a second level (610) containing the coefficient value at position 0 and a second subset at the second level (610) containing the coefficient values at positions 1 through 63. The set for position 0 is a set with a single coefficient value, and therefore a non-zero value of the frequency coefficient at position 0 would be entropy encoded. The subset for positions 1 to 63 at the second level (610) is split into two subsets at a third level (615). The first of the subsets at the third level (615) contains the coefficient values at positions 1 through 3, and the second of the subsets at the third level (615) contains the coefficient values at positions 4 through 63. The respective subsets at the third level (615) are split into multiple subsets at a fourth level, and so on, as shown in FIG. 6A.

FIG. 6B shows a second multi-level nested set representation (650) according to which the set (for positions 0 to 63) at the first level (655) is split into two subsets at a second level (660), and the second subset (for positions 1 to 63) at the second level (660) is split into three subsets at a third level (665). The representation (650) in FIG. 6B is broader than the representation (600) in FIG. 6A but not as deep, since sets (or subsets) are split into three or four subsets at a lower level.

FIG. 6C shows a third multi-level nested set representation (680) according to which the set (for positions 0 to 63) at the first level (685) is split into four equal-size subsets at a second level (690), and each of the subset at the second level (690) is split into four subsets at a third level (695). The representation (680) in FIG. 6C is even broader than the representation (650) in FIG. 6B, since sets (or subsets) are split into four subsets at each lower level.

Figure 7A:
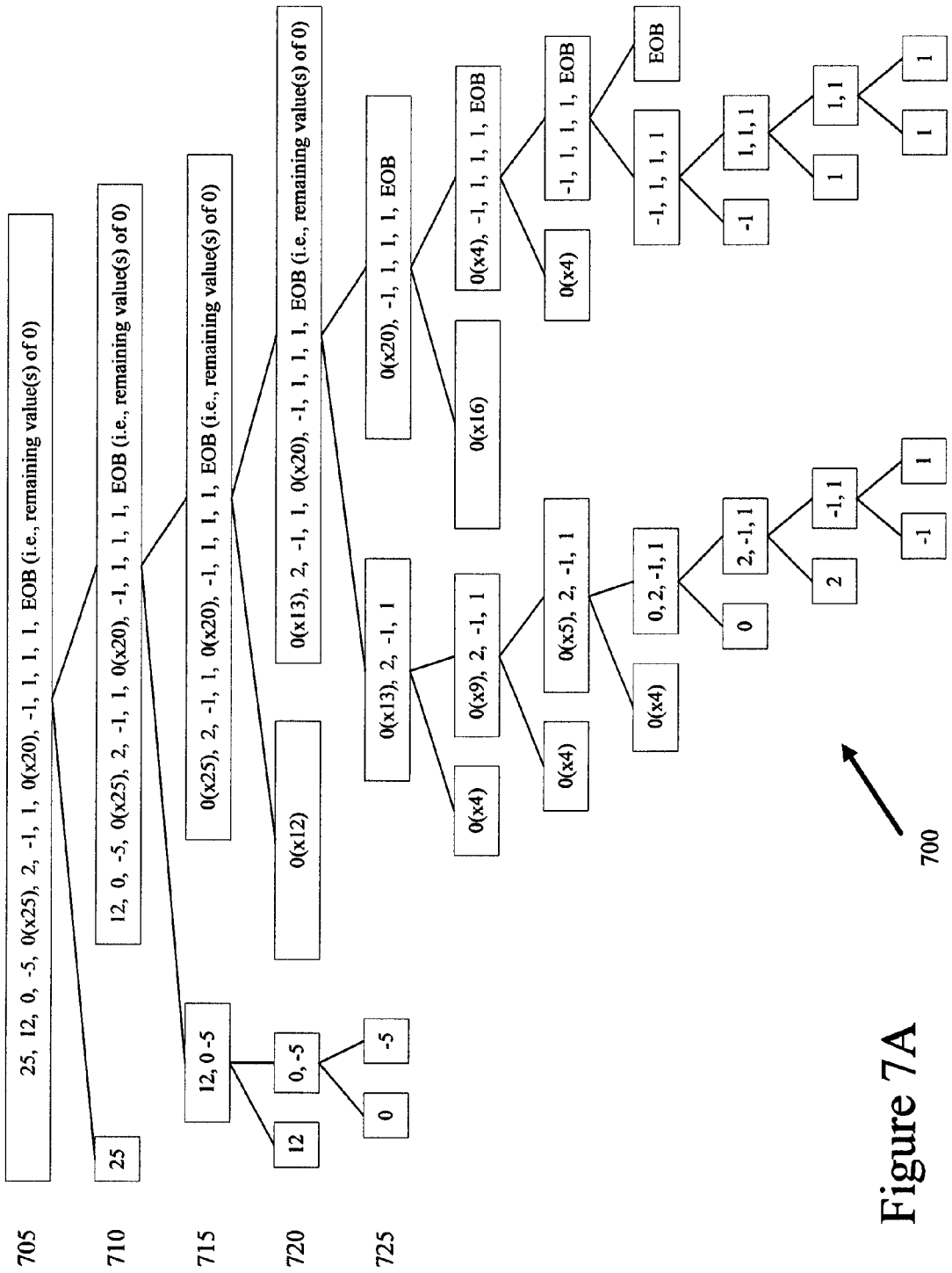
FIGS. 7A and 7B are diagrams illustrating the application of the multi-level nested set representation of FIG. 6A to the reordered coefficient values shown in FIGS. 5B and 5C, respectively.

FIG. 7A illustrates application of the multi-level nested set representation (600) of FIG. 6A to the one-dimensional string (560) of FIG. 5B. The one-dimensional string (560) provides the first-level set (705) comprising values for coefficients from position 0 through position 63. The two subsets at the second level (710) comprise a first subset for the coefficient at position 0, and a second subset for the coefficients at positions 1 through 63. Even though the first subset includes a single coefficient (for position 0), the encoder/decoder represents the first subset at the second level (710) as a "set." The encoder/decoder also represents the second subset at the second level (710) (comprising values for the coefficients at positions 1 through 63) as a set. The second subset is split into two subsets at a third level (715). The first of the third-level subsets comprises the coefficients values 12, 0, and −5, which are the coefficient values at coefficient positions 1, 2, and 3, respectively. The second third-level subset comprises the coefficient values at coefficient positions 4 through 63.

The first subset at the third level (715) is split into two subsets at a fourth level (720). The first of these fourth-level subsets comprises the coefficient value 12, which is the coefficient value at the coefficient position 1. The other of these fourth-level subsets comprises the values 0 and −5, which are the coefficient values at coefficient positions 2 and 3. This fourth-level subset is split into two subsets at a fifth level (725). The first of these fifth-level subsets comprises a single coefficient value of 0 at coefficient position 2, and the second of these fifth-level subsets comprises a single coefficient value of −5 at coefficient position 3.

Returning to the third level (715), the second subset at the third level (715) (containing the coefficient values at coefficient positions 4 through 63) is split into two subsets at the fourth level (720). The first of these fourth-level subsets comprises values for the coefficients at positions 4 through 15, and the second of these fourth-level subsets comprises values for the coefficients at positions 16 through 63. In this example, the coefficient values at coefficient positions 4 through 15 are all 0. Because of this, in practice, the subset for positions 4 to 15 does not need to be further divided because it does not contain any non-zero coefficient values. The subset containing the values for coefficients at positions 16 through 63 is split into two separate subsets at the fifth level (725), each including a mix of zero-value coefficients and non-zero-coefficients. This analysis and selective splitting of sets into subsets is continued until all of the non-zero frequency coefficients have been located.

Figure 7B:
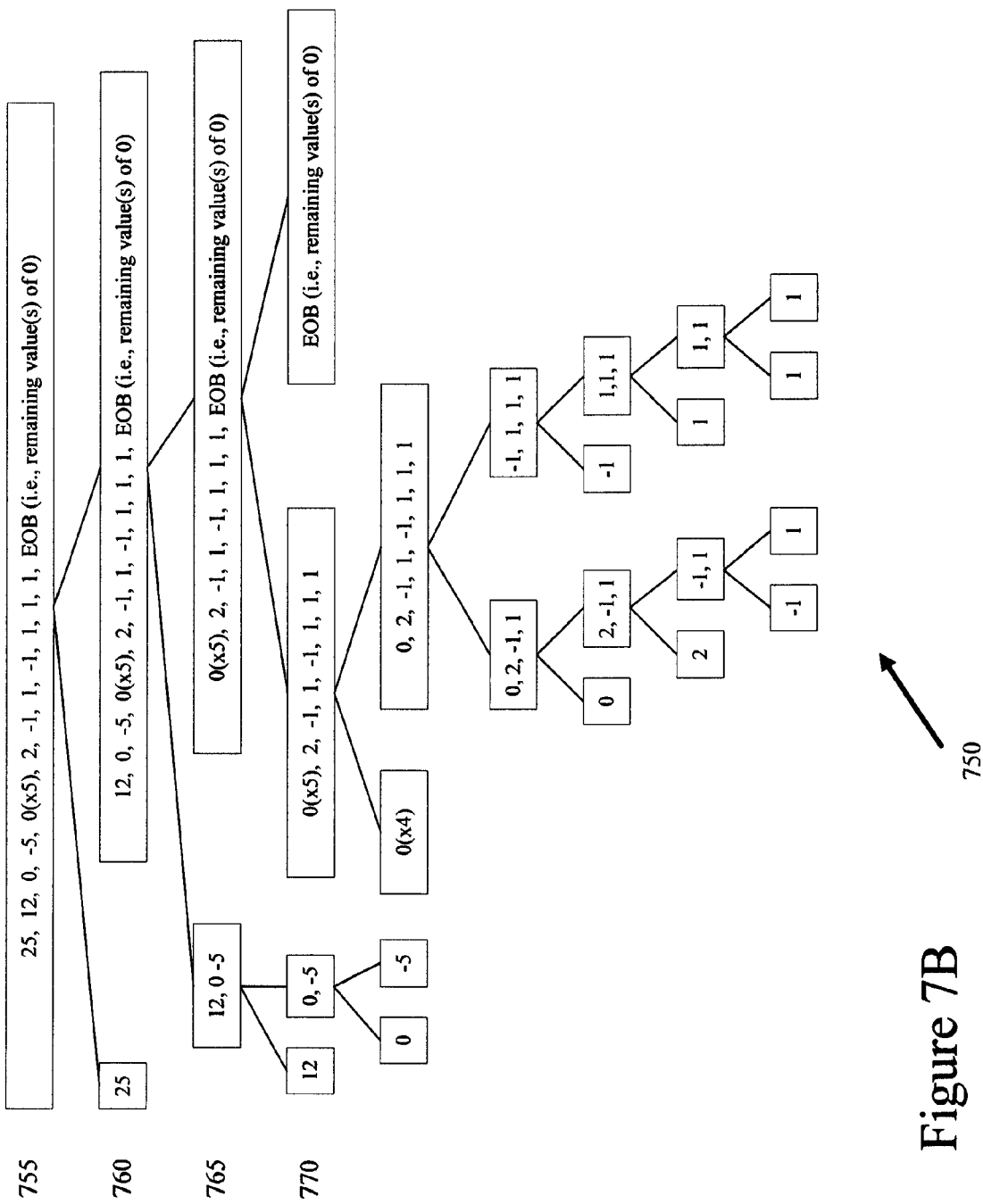

FIG. 7B illustrates application of the multi-level nested set representation (600) of FIG. 6A to the one-dimensional string (570) of FIG. 5C. Overall, FIG. 7B shows that the scan order (520) of FIG. 5C clusters the transform coefficients (400) of FIG. 4 more effectively than the scan order (510) of FIG. 5B when used with the multi-level nested set representation (600) of FIG. 6A.

The one-dimensional string (570) provides the first-level set (755) comprising values for coefficients from position 0 through position 63. The first-level set (755) is split into two subsets. The two subsets at the second level (760) comprise a first subset for the coefficient at position 0, and a second subset for the coefficients at positions 1 through 63. The subset for position 0 contains a single value, the coefficient value 25 at coefficient position 0. The subset for positions 1 through 63 is split into two subsets at a third level (765).

The first of the third-level subsets comprises the coefficients values 12, 0, and −5, and is handled as described with reference to FIG. 7A. The second third-level subset (for the coefficient values at coefficient positions 4 to 63) is split into two subsets at the fourth level (770). The first of these fourth-level subsets, comprising values for the coefficients at positions 4 through 15, is further split into two fifth-level subsets. One fifth-level subset contains only zero-value coefficients and is not further split; the other fifth-level subset contains a mix of zero-value coefficients and non-zero-value coefficients and is further split as shown in FIG. 7B. The second of the fourth-level subsets, which comprises zero values for the coefficients at positions 16 through 63, is not further split.

Alternatively, an encoder and decoder apply different scan patterns and/or partitioning schemes during encoding and decoding of transform coefficients. Or, an encoder and decoder apply one or more of the entropy encoding and decoding techniques to other data values that are hierarchically organized.

V. Encoding and Decoding Hierarchically Organized Data

In embodiments of the techniques and tools described herein, an encoder entropy encodes data values hierarchically, and a corresponding decoder entropy decodes the hierarchically encoded data values. For example, an encoder and decoder use efficient, low-complexity adaptive Huffman coding and decoding of transform coefficients for image or video. Depending on implementation, innovative aspects of the encoding and decoding include, but are not limited, to the following.

- Encoding/decoding set symbols for data values organized as a set with a hierarchy of subsets, including (a) selectively coding/decoding codes for the set symbols of subsets, and (b) selectively repeating operations of the encoding/decoding for the respective subsets. Such encoding and decoding can facilitate efficient, low-complexity implementations.
- Using an alphabet of nested elements for set symbol of a set with one or more data values. For example, when each of the data value(s) in a set is zero, an encoder/decoder uses a first element A0 as set symbol. Otherwise, when each of the data value(s) in the set is −1, 0 or 1, the encoder/decoder uses a second element A1 as set symbol for the set. Otherwise, the encoder/decoder uses a third element A2 as set symbol for the set. Using nested alphabet elements can help reduce the size of codebooks used to encode/decode set symbols.
- Joint variable length coding/decoding of set symbols for the subsets of a set. For example, the coding/decoding uses a single VLC to jointly represent the set symbols of two subsets of a set.
- Using different codebooks for the subsets of a set depending on the set symbol of the set. For example, an encoder/decoder uses no codebook when the set symbol is A0 for the set. The encoder/decoder uses a first codebook whose size is three to represent the subset combination A0-A1, A1-A0 or A1-A1 when the set symbol is A1 for the set. Similarly, the encoder/decoder uses a second codebook whose size is five to represent the subset combination A0-A2, A1-A2, A2-A2, A2-A1 or A2-A0) when the set symbol is A2. Reducing codebook size in this way can help reduce bit rate and speed up codebook lookup operations, by eliminating from consideration codes that are inapplicable in a situation.
- Adaptive encoding/decoding by switching between codebooks depending on the history of occurrences of symbol combination codes in data. For example, an encoder/decoder switches between three different five-code codebooks depending on which symbol combination codes have been used in encoding/decoding.

Adaptive encoding/decoding by shuffling the associations between VLCs and the subset symbol combinations represented in a given codebook. For example, during encoding/decoding, an encoder/decoder tracks which subset symbol combinations are used and updates the mappings between VLCs and symbol combinations in a given codebook.

Adaptive encoding/decoding by switching between different context models during encoding/decoding. For example, an encoder/decoder uses different adaptive codebooks for different types or positions of data values.

For image and video encoding/decoding applications, encoding/decoding CBP information organized as a set with a hierarchy of subsets.

For image and video encoding/decoding applications, encoding/decoding quantized transform coefficients organized as a set with a hierarchy of subsets.

These and other innovative aspects of entropy encoding and decoding hierarchically organized data values are explained with reference to example implementations in the following sections.

A. Example Symbol Alphabets

An encoder and decoder can use a symbol alphabet with nested elements. The number of nested elements in the alphabet depends on implementation.

For example, the encoder and decoder use a symbol alphabet with two nested elements $A0$ and $A1$. For a set of multiple data values (which can itself be a subset of another set), the symbol $A0$ indicates that the set includes only zero-value data values, and the symbol $A1$ indicates that the set includes at least one non-zero data value. For an individual data value, the symbol $A0$ indicates that the data value is zero, and the symbol $A1$ indicates that the data value is non-zero, with one or more other codes indicating the actual value.

Figure 8:
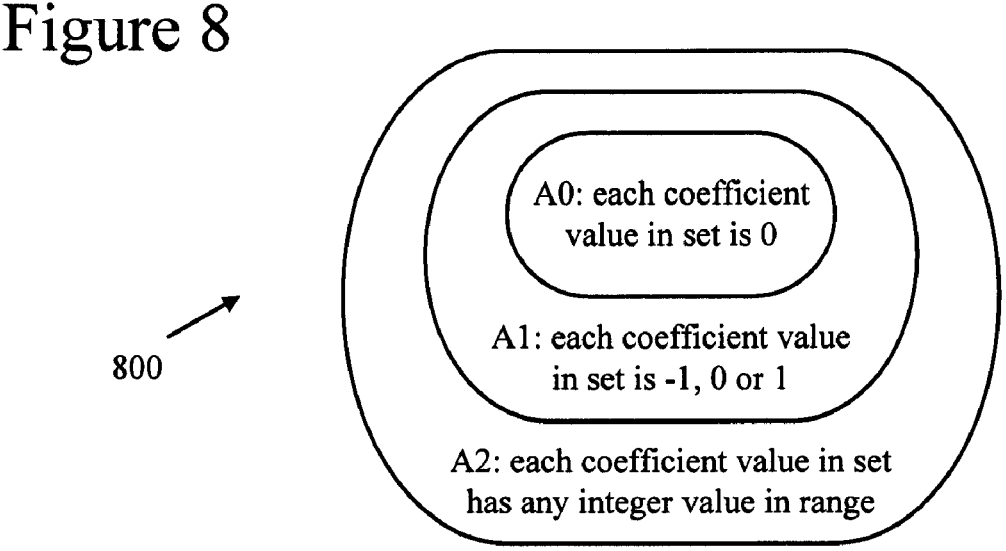
FIG. 8 is a diagram illustrating an example alphabet with nested symbol elements.

Another example symbol alphabet (800), as shown in FIG. 8, has three elements $A0$, $A1$ and $A2$. The first element $A0$ indicates that, for a given set (which can itself be a subset of another set) of one or more values (set_v), each value v in set_v is equal to 0. In other words, there are no non-zero values in set_v. The second element $A1$ indicates that, for at least one v in set_v, v=1 or −1; other values v in set_v may be equal to 0, as long as at least one v is equal to 1 or −1 and none has an absolute value more than 1. The third element $A2$ indicates that, for at least one v in set_v, v is greater than 1 or less than −1; other values v in set_v may be equal to 0, 1, or −1, as long as at least one v is greater than 1 or less than −1.

In other example symbol alphabets, $A2$ may signify that at least one v in set_v is above or below a different number, for example, 2, 4 or 8. Or, the alphabet has a different number of nested elements, such as four elements $A0$, $A1$, $A2$ and $A3$, where $A2$ indicates each data value in a set is −2, −1, 0, 1, or 2 (with at least one 2 or −2), and where $A3$ indicates at least one data value in a set has an absolute value greater than 2. Or, an encoder and decoder use a symbol alphabet with non-nested elements in encoding/decoding technique described herein.

B. Example Symbol Combination Codes

When encoding/decoding data values that are organized hierarchically, an encoder and decoder use symbols for sets and subsets of the data values. Each symbol represents an individual data value or a set of multiple data values (which may itself be a subset). Depending on implementation, the encoder/decoder use adaptive Huffman coding/decoding, non-adaptive Huffman coding/decoding, or other adaptive or non-adaptive variable length coding/decoding of the symbols. Whether the codes are Huffman codes, Golomb codes or other VLCs, the actual codes and symbol combinations represented with the codes depend on implementation.

The following two tables show example codes representing combinations of symbols from the alphabet (800) with nested elements $A0$, $A1$ and $A2$. Table 1 indicates example symbol combination codes for a set X (which can itself be a subset of another set) containing data values, at least one of which is equal to 1 or −1 but none of which has an absolute value more than 1. Table 2 indicates example symbol combination codes for a set X (which can itself be a subset of another set) containing data values, at least one of which has a value greater than 1 or less than −1. Each of the symbol combination codes indicates information about subsets $X\_1$ and $X\_2$ of the set X (namely, the code indicates the respective set symbols for the subsets $X\_1$ and $X\_2$). A given subset can include a single data value.

TABLE 1

Symbol combination codes for an example 3-code codebook

| symbol combination code for set X | meaning for subset $X\_1$ of set X | meaning for subset $X\_2$ of set X |
|---|---|---|
| SCC_3_0 | A0 | A1 |
| SCC_3_1 | A1 | A0 |
| SCC_3_2 | A1 | A1 |

TABLE 2

Symbol combination codes for an example 5-code codebook

| symbol combination code for set X | meaning for subset $X\_1$ of set X | meaning for subset $X\_2$ of set X |
|---|---|---|
| SCC_5_0 | A2 | A2 |
| SCC_5_1 | A1 | A2 |
| SCC_5_2 | A0 | A2 |
| SCC_5_3 | A2 | A1 |
| SCC_5_4 | A2 | A0 |

If a given set with non-zero values includes only values of −1, 0 or 1, a code from Table 1 represents the set symbols of the subsets of the set. For a set X (which can itself be a subset of another set), each of the symbol combination codes in Table 1 indicates whether $A0$ or $A1$ applies for each of the two subsets $X\_1$ and $X\_2$ of X, respectively. For example, if a set includes data values −1, 1, 1, 1, 0, 0, 0, 0, 0, 0, 0, 0, and the set is split into a first subset with −1, 1, 1 and 1 and a second subset with eight zeros, the code SCC_3_1 represents the set symbols of the subsets of the set. When a given subset includes a single data value that is 1 or −1 (the absolute value being previously indicated by the set symbol of the given subset), the sign of the value can be signaled to indicate the value. Such signaling can immediately follow the SCC_3_*x* code in the bit stream for the single-value subset, or it the sign bits can be signaled in order after the last of the SCC codes for the set.

If a given set with non-zero values includes at least one non-zero value greater than 1 or less than −1, a code from Table 2 represents the set symbols of the subsets of the set. Each of the symbol combination codes in Table 2 indicates whether $A0$, $A1$ or $A2$ applies for each of the two subsets $X\_1$ and $X\_2$ of X, respectively. For example, if a subset of data values contains 0 and −5, the code SCC_5_2 indicates that the first data value is zero and the second data value is non-zero with an absolute value greater than 1. If the subset of data values contains 0, 0, 0, 0, 0, 2, −1, 1 and is split evenly into two subsets, the code SCC_5_2 indicates the first subset 0, 0, 0, 0 includes only zero-value data values and the second subset 0, 2, −1, 1 includes at least one non-zero data value with an absolute value greater than 1. When a given subset includes a single data value whose absolute value is greater than 1, the value can be signaled with one or more additional VLCs (e.g., a sign bit and VLC indicating level). Such signaling can immediately follow the SCC_5_x code in the bit stream for the single-value subset, or it the VLC(s) can be signaled in order after the last of the SCC codes for the set.

Each of the terms SCC_5_x and SCC_3_x is simply an indicator of a VLC (such as a Huffman code or Golomb code) having a particular pattern of bits. The actual bit patterns used depend on implementation. The following tables show example bit patterns for symbol combination codes.

TABLE 3

Example VLCs used as symbol combination codes in 3-code codebook

| symbol combination code for set X | bit pattern |
|---|---|
| SCC_3_0 | 0 |
| SCC_3_1 | 10 |
| SCC_3_2 | 11 |

TABLE 4

Example VLCs used as symbol combination codes in 5-code codebooks

| symbol combination code for set X | bit pattern for codebook 0 | bit pattern for codebook 1 | bit pattern for codebook 2 |
|---|---|---|---|
| SCC_5_0 | 0 | 0 | 00 |
| SCC_5_1 | 10 | 100 | 01 |
| SCC_5_2 | 110 | 101 | 10 |
| SCC_5_3 | 1110 | 110 | 110 |
| SCC_5_4 | 1111 | 111 | 111 |

One advantage of switching between a 3-code codebook and 5-code codebook is small memory footprint, since no large code tables are stored in memory. Another advantage is encoding efficiency. Consider the 9 different pair-wise combinations of A0, A1 and A2. Using no code for A0-A0, a one-bit code or two-bit code for a pair A0-A1, A1-A0 or A1-A1, and a longer code for a pair including A2, is much more efficient in terms of rate-distortion performance than using a single codebook for all of the different pair-wise combinations.

Example implementations switch between 3-code and 5-code codebooks during encoding and decoding of coefficient values for a macroblock. Alternatively, an encoder and decoder switch between 3-code and 5-code codebooks in another application (for example, audio encoding/decoding or general data compression/decompression). Or, for a different alphabet of nested elements (e.g., with elements A0, A1, A2 and A3), an encoder and decoder switch between a different number of reduced-size codebooks (e.g., a 3-code codebook, 5-code codebook and 7-code codebook) for combinations of the elements. Or, an encoder and decoder switch between reduced-size codebooks representing 3-tuples or more generally x-tuples of elements from an alphabet with nested elements.

For adaptive coding/decoding, the mappings of bit patterns for symbol combinations can change. For example, if the symbol combination for SCC_3_1 becomes more common than the symbol combination for SCC_3_0 in the data being encoded/decoded, the bit pattern 10 is mapped to SCC_3_0, and the bit pattern 0 is mapped to SCC_3_1. Table 4 shows 5-code codebooks that reflect different expected probability distributions of symbol combination codes. In addition to shuffling associations between symbol combinations and bit patterns within a given codebook, an encoder and decoder can, depending on implementation, switch between different codebooks. Switching between codebooks of the same size (e.g., different 5-code codebooks) can help an encoder improve rate-distortion performance by more aggressively adapting to changes in the distribution of symbol combinations.

In many encoding and decoding scenarios, symbol combination codes facilitate effective encoding and decoding of data values by grouping zero-value data values. When a decoder receives a code SCC_5_2 for a set X, then the decoder recognizes that every data value in subset X_1 of set X has the value 0. The decoder therefore will not need to spend time further decoding subset X_1, but can instead assign the value 0 to every data value in the subset X_1 and proceed with decoding a different subset such as X_2 (which has a non-zero data value indicated for the subset). Thus, using symbol combination codes can also decrease the number of symbols necessary to encode data values.

Figure 9A:
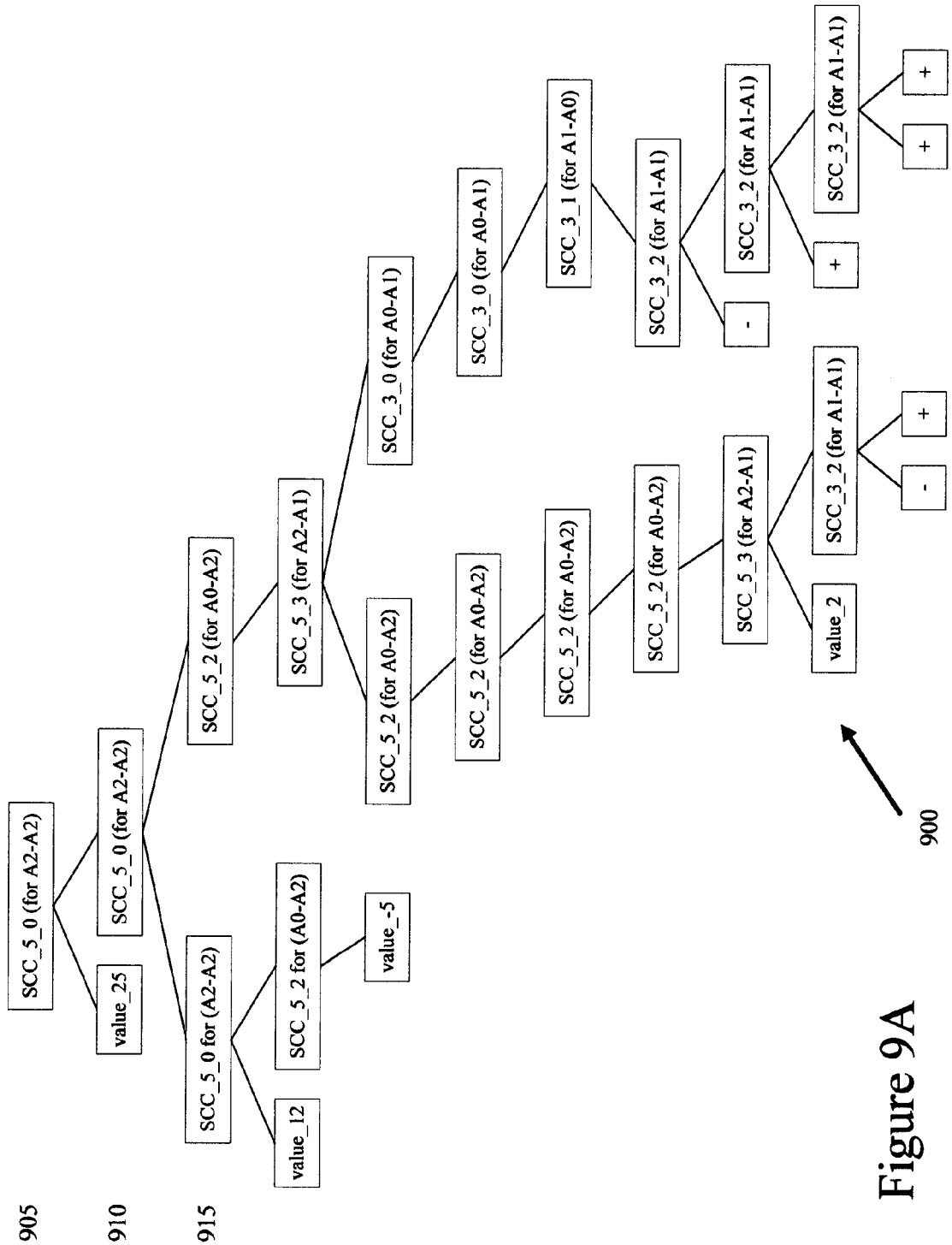
FIGS. 9A and 9B are diagrams illustrating the application of example symbol combination codes to the multi-level nested set representations of FIGS. 7A and 7B, respectively.
Figure 9B:
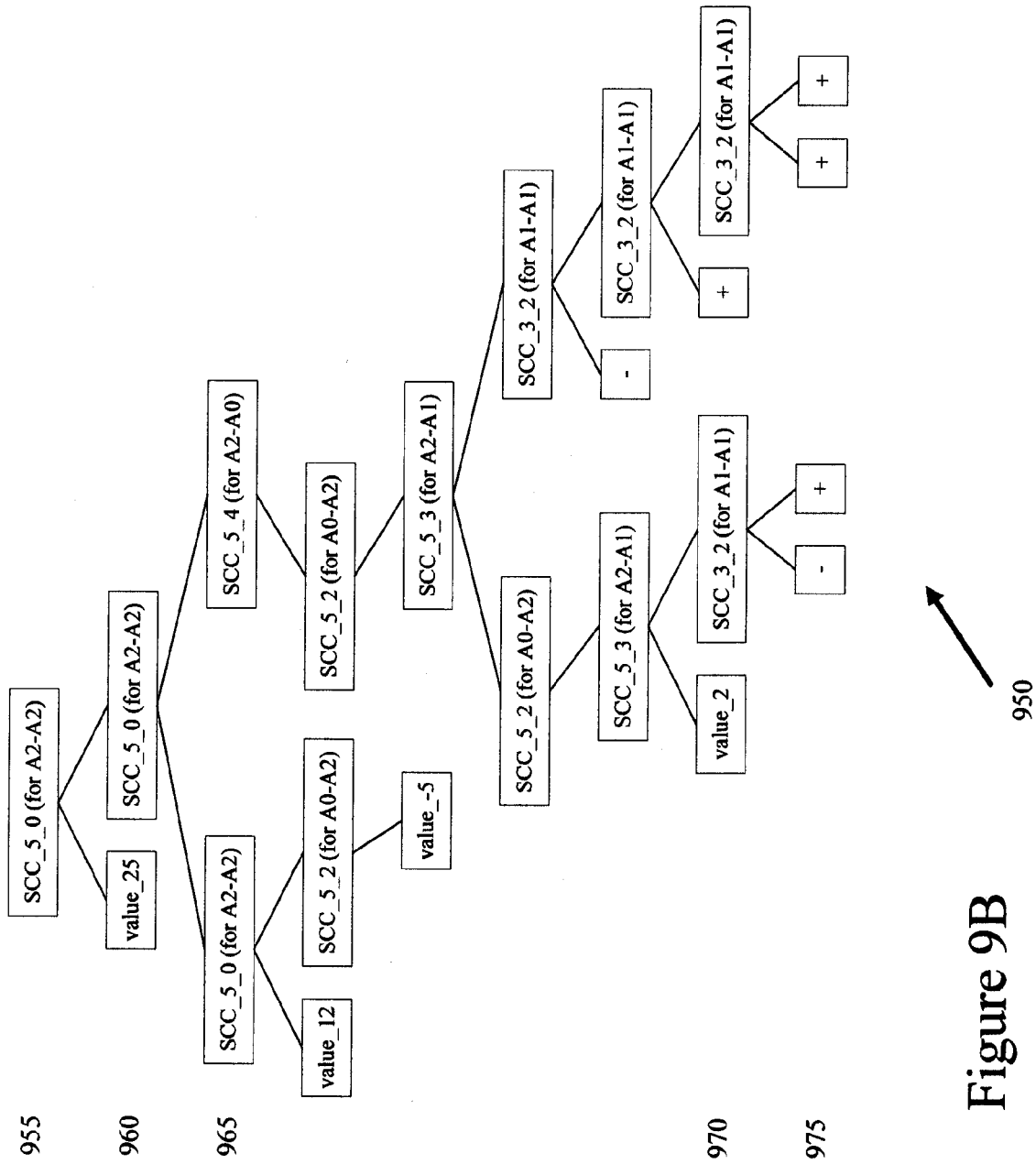

FIG. 9A shows the application of the codes of Tables 1 and 2 to the multi-level nested set representation of FIG. 7A. At the first level (905), SCC_5_0 indicates that the set is split into two subsets, each having at least one non-zero coefficient value with an absolute value greater than 1. The first subset (for position 0) has a single value value_25 that is signaled (following the code SCC_5_0 from the first level (905) or in later signaling) as one or more VLCs, for example, a Golomb code or Huffman code along with a sign bit. The second subset (for positions 1 to 63) is itself split into two subsets, each having at least one non-zero coefficient value with an absolute value greater than 1, indicated with the code SCC_5_0 at the next level (910). FIG. 9B shows the application of the codes of Tables 1 and 2 to the multi-level nested set representation of FIG. 7B. Compared to FIG. 9A, fewer codes are used because the multi-level nested set representation is more compact.

An encoder can signal the codes shown in FIGS. 9A and 9B according to a depth-first traversal of the representation: SCC_5_0, SCC_5_0, SCC_5_0, SCC_5_2, SCC_5_2, SCC_5_3, and so on for the codes in FIG. 9A. The encoder can interleave sign bits and VLCs indicating levels among the symbol combination codes to indicate data values, for example, according to a depth-first traversal (e.g., SCC_5_0, value_25, SCC_5_0, SCC_5_0, value_12, SCC_5_2, value_−5, SCC_5_2, SCC_5_3, and so on). Or, the encoder can signal sign bits and VLCs indicating levels after the last of the symbol combination codes for the set. Alternatively, the encoder signals the codes shown in FIGS. 9A and 9B according to a breadth-first traversal of the representation.

For corresponding decoding, a decoder receives a bit stream that includes symbol combination codes, such as those shown in Tables 1 and 2, sign bits and VLCs for data values. The decoder then decodes the bit stream to reconstruct the values and relative positions of the data values. For example, following a depth first traversal of the example of FIG. 9A, the decoder receives and parses the code SCC_5_0, which indicates that each of the first second-level subset (corresponding to the coefficient at position 0) and the second second-level subset (corresponding to the coefficients at positions 1-63) comprises one or more non-zero coefficient values whose absolute value is greater than 1. The decoder next receives and parses code SCC_5_0 from the bit stream, indicating the set symbol pair A2-A2 for subsets 1-3 and 4-63, respectively. The first subset at a next lower level (corresponding to coefficient positions 1-3) and the second set at the next lower level (corresponding to coefficient positions 4-63) each contain one or more non-zero valued coefficients whose absolute value is greater than 1. Following the depth-first traversal of FIG. 9A, the decoder then receives and parses the codes SCC_5_0 (for subset 1-3), SCC_5_2 (for subset 2-3), SCC_5_2 (for subset 4-63), SCC_5_3 (for subset 16-63), and so on. Interleaved among the symbol combination codes or after the symbol combination codes (but following the order of non-zero coefficients in the traversal of the hierarchy), the bit stream includes sign bits and VLCs indicating levels of data values.

Alternatively, an encoder and decoder use other codes to represent symbols when encoding/decoding data values that are organized hierarchically.

C. Generalized Encoding Techniques

FIG. 10 shows a generalized technique (1000) for encoding data values as a set with a hierarchy of subsets. An encoder such as the encoder (200) of FIG. 2 or other encoder performs the technique (1000).

The encoder receives (1010) data values. For example, an entropy encoding module of an encoder receives data values from another module of the encoder. In video coding applications, the data values can be quantized transform coefficients for a block of sample values or motion compensation residual values, from an input video picture or picture of inter-layer residual video. Alternatively, the encoder receives another kind of data values.

The encoder evaluates (1020) the data values as a set and decides (1030) whether to use a symbol combination code for subsets of the set. For example, the encoder checks how the data values of the set are classified according to the symbol alphabet that the encoder uses. The conditions that the encoder checks depend on implementation details such as the number and definition of elements in the symbol alphabet.

In some cases (e.g., at least one of the data values in the set is non-zero), the encoder splits the set into subsets and uses (1040) a symbol combination code that indicates the set symbols of the subsets. For example, the encoder uses a symbol combination code as shown in Table 1 or 2. Alternatively, the encoder uses some other symbol combination code. In other cases (e.g., if the data values in the set are all zero), the encoder skips using the symbol combination code, since the set symbols of the subsets are implied by the set symbol of the set.

Then, for each of the subsets, the encoder selectively repeats (1050) operations of the encoding, using that subset as a new set. For example, if a given subset includes multiple data values, the encoder repeats the evaluating, the selective use of a symbol combination code and the selective repetition of encoding operations for the subset. In some implementations, the encoder can skip the repetition (1050) if a given subset includes multiple data values but all of the data values are zero, since symbol combination codes will not be used for the subset.

During the encoding of symbol combination codes or after such encoding, the encoder can signal sign bits and codes indicating data values, to the extent those data values are not already implied by the set symbols of the subsets in the hierarchy. For example, when the symbol alphabet of FIG. 8 is used, the encoder uses no value codes when a data value is zero, uses a sign bit to indicate a single value that is 1 or −1, or uses a VLC and sign bit to indicate a single value that is greater than 1 or less than −1.

An encoder can use the technique (1000) to encode quantized transform coefficients of a block, CBP information for a macroblock, and/or other data values for image or video encoding. Alternatively, the encoder receives and encodes another type of data. The encoder repeats the technique (1000) on a set-by-set basis (e.g., block-by-block basis for quantized transform coefficients, macroblock-by-macroblock basis for CBP information and blocks of transform coefficients in a macroblock).

D. Example Encoding Techniques

Figure 11:
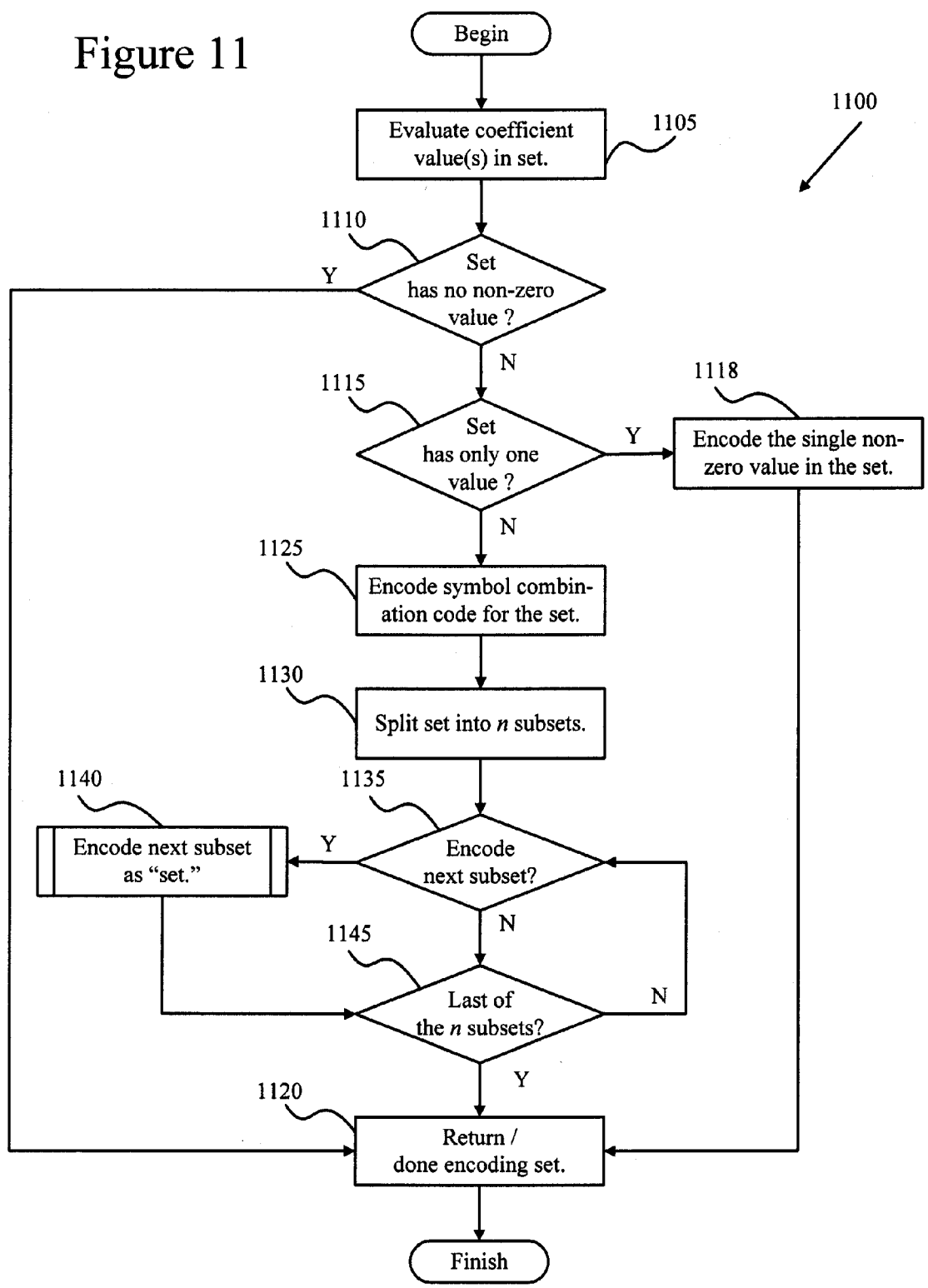
FIG. 11 is a flowchart illustrating an example technique for encoding a set of quantized transform coefficients for a block using a multi-level nested set representation.

FIG. 11 shows an example technique (1100) of encoding a block of quantized transform coefficients using a multi-level nested set representation. The technique (1100) is a specific variation of the generalized technique (1000) of FIG. 10. With the technique (1100), an encoder follows a depth-first traversal and uses interleaved signaling of sign bits and VLCs that indicate data value levels. An encoder such as the encoder (200) of FIG. 2 or other encoder performs the technique (1100).

Aspects of the technique (1100) are recursive. When encoding a set of coefficient values, the technique (1100) in some cases recursively encodes a subset of coefficient values within the set, or each of multiple subsets within the set. The technique (1100) includes an exit condition, upon which the technique (1100) returns to the point of entry or is done encoding the set.

In this technique (1100), the encoder receives a set of coefficient values in a one-dimensional string produced by reordering the coefficient values of a block according to a particular scan order. The encoder evaluates (1105) the one or more coefficient values at the given level of the set. When this technique (1100) is first initiated, the set of plural coefficients will generally include all of the plural coefficients in the one-dimensional string. Later, the technique (1100) may be performed on a smaller set that is subset of the one-dimensional string. For this reason, the set in question may comprise 64 coefficient values, 63 coefficient values, 32 coefficient values, 16 coefficient values, 1 coefficient value, or some other number of coefficient values.

The encoder checks (1110) whether the given set of coefficients contains no non-zero coefficient value (i.e., contains all zero-value coefficients). If so, the encoder returns (1120) to the point of entry (for a subset) or is done encoding that particular set of coefficients.

Otherwise, the encoder checks (1115) whether the given set of coefficients contains only a single coefficient (which is non-zero since the first condition (1110) was satisfied). If the set does contain only a single coefficient (and the single coefficient is non-zero), then the encoder encodes (1118) the value of the coefficient. For example, the encoder uses Golomb coding, Huffman coding, or another form of variable length coding for the single coefficient value. If the level of the value of the single coefficient is implied elsewhere (e.g., when the coefficient is −1 or 1 for some types of entropy coding and symbol alphabets), the encoder signals a flag indicating the sign of the single coefficient. The encoder then returns (1120) to the point of entry (for a subset) or is done encoding that particular set of coefficients.

Otherwise (i.e., the set includes multiple coefficients, at least of which is non-zero), the encoder analyzes the set and encodes (1125) a symbol combination code for the set. Generally, symbol combination code indicates that the given set should be split into n subsets and gives information about the presence or absence of non-zero coefficient values in each of the n subsets. For example, the symbol combination code indicates (1) that a first subset does not include at least one coefficient with a non-zero value, (2) that a second subset does include at least one coefficient with a non-zero value, and (3) that a third subset does not. For some multi-level nested set representations, n is equal to 2 and each set can be split into two subsets. Alternatively, n is some other number such as 3 or 4. Depending on the symbol alphabet used, the symbol combination code may additionally indicate other information about the non-zero value(s) of the coefficients in the respective subsets, such as whether any coefficient in a subset is greater than or equal to a given value.

The encoder then splits (1130) the given set into n subsets of coefficients and decides whether to recursively encode each of the n subsets of coefficients. The encoder checks (1135) to see whether to encode the first of the subsets as a "set." If the first of the subsets contains a non-zero coefficient, then the encoder performs the method (1100) on the first subset at a lower level and thereby encodes (1140) the first subset as a "set." When the subset is encoded (1140), the codes produced by the encoder performing the method (1100) are organized to make clear that the coefficient values being analyzed are a subset of the first set, and are being analyzed at a lower level of representation in the nested set representation.

If the first subset should not be encoded because it does not contain at least one non-zero coefficient, the encoder then checks (1145) if other subsets remain in the set. Similarly, after the encoder has encoded (1140) the first subset, the encoder checks (1145) if other subsets remain in the set. If another subset exists, then the encoder checks (1135) to see whether to encode the subset as a "set" (e.g., whether the set includes any non-zero coefficients) and, if so, the encoder encodes (1140) the subset. After the encoder has determined that no other subsets remain for a set, the encoder returns (1120) to the point of entry (for a subset) or is done encoding that particular set of coefficients—the encoder either returns to a higher level to encode a next set or subset, or moves to another block or picture.

Alternatively, the encoder encodes another type of data using the technique (1100) of FIG. 11. The encoder repeats the technique (1100) on a set-by-set basis (e.g., block-by-block basis for quantized transform coefficients).

E. Representation of Coded Block Pattern Information

For image and video coding applications, an encoder and decoder can encode and decode CBP information that is organized hierarchically. In general, CBP information for a macroblock indicates whether the respective blocks of the macroblock have signaled information in a bit stream. For example, for a macroblock with four Y (luma) blocks, two U (chroma) blocks and two V (chroma) blocks, a CBP includes 8 bits, one bit per block of the macroblock. If a given block has quantized transform coefficient information signaled in the bit stream, the bit for the block is 1; otherwise (no quantized transform coefficient information signaled for the block), the bit for the block is 0.

Figure 12:
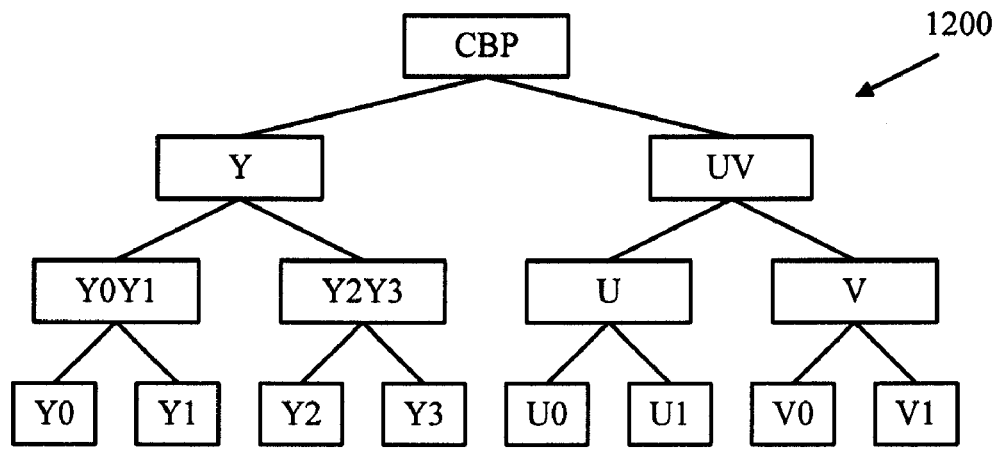
FIG. 12 is a diagram illustrating an example hierarchical organization for coded block pattern information.

FIG. 12 shows an example hierarchical organization (1200) for CBP information. A top-level syntax element represents the CBP information as a whole for a macroblock. The CBP element has two subsets, a Y subset representing the luma blocks of the macroblock and a UV subset representing the chroma blocks of the macroblock. The Y subset has Y0Y1 and Y2Y3 subsets, each of which has two subsets representing the coded status of individual Y blocks. The UV subset has U and V subsets. The U subset has two subsets representing the coded status of two blocks U0 and U1, and the V subset has two subsets representing the coded status of two blocks V0 and V1.

Alternatively, CBP information uses another organization for encoding and decoding the CBP information as a set with a hierarchy of subsets. For example, for different chroma sub-sampling rates and macroblock organizations (e.g., YUV 4:4:4, YUV 4:2:0), the encoder and decoder use a different hierarchical organization for CBP information. For other syntax elements, the encoder and decoder can use a partitioning scheme that fits the distribution of values of the syntax element.

F. Adaptive Encoding Variations

In adaptive variations of the encoding of data values, an encoder uses one or more adaptive mechanisms to improve compression efficiency. The encoder can use the one or more adaptive mechanisms separately or in combination. For the sake of simplicity, FIGS. 13A, 13B and 13C do not show how the respective techniques relate to other parts of the encoding process.

Figure 13C:
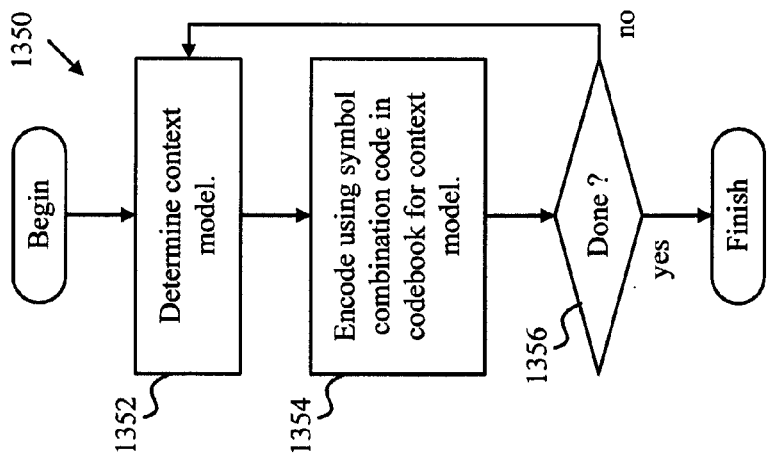
FIGS. 13A, 13B and 13C are flowcharts illustrating example techniques for adapting encoding with one or more codebooks of symbol combination codes.
Figure 13B:
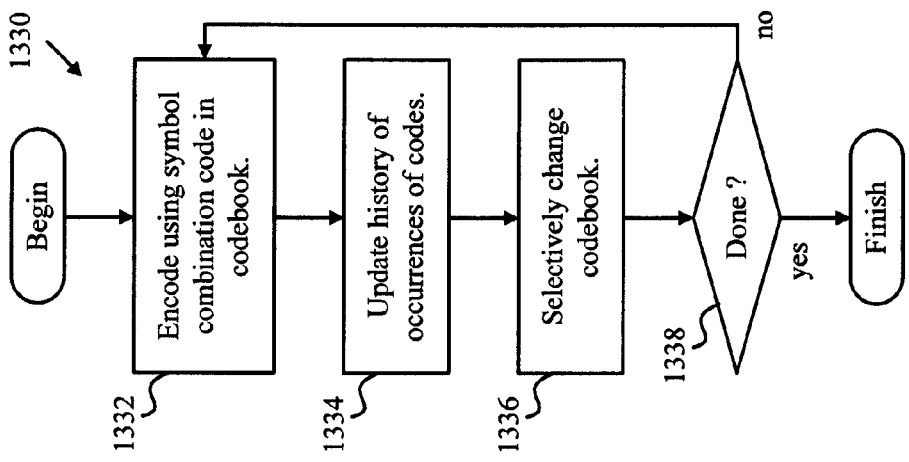
Figure 13A:
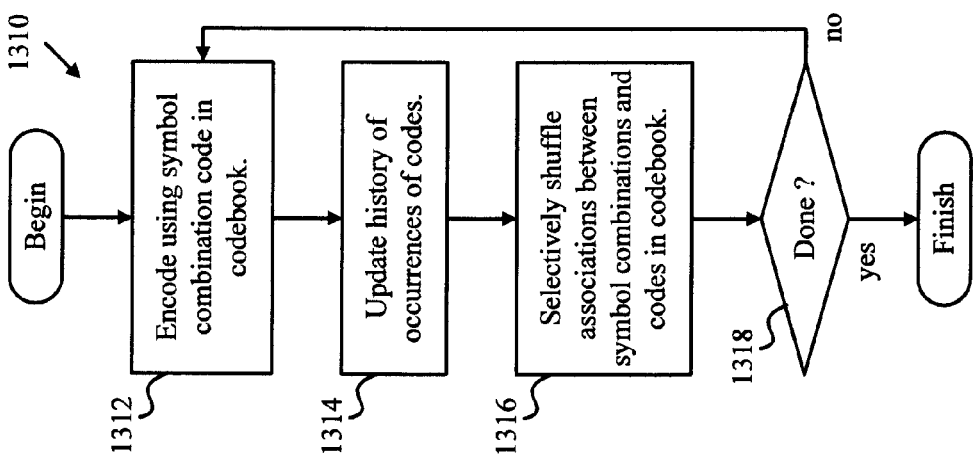

FIG. 13A is a flowchart illustrating an example technique (1310) for adapting encoding by shuffling associations between code entries and set symbol combinations represented in a codebook. An encoder such as the encoder (200) of FIG. 2 or other encoder performs the technique (1310).

The encoder uses (1312) a symbol combination code from a codebook during encoding then updates (1314) the history of occurrences of codes. For example, the encoder tracks how many times each of the codes in the codebook has been used during encoding or during a current period of the encoding. After initializing the data structure or variables used in the tracking, the encoder can increment a counter for each code when the code is used, or the encoder can otherwise update the history of occurrences.

The encoder selectively shuffles (1316) the associations between symbol combinations and codes in the codebook. For example, the encoder checks whether to remap codes after each code is used. Alternatively, the encoder checks on some other basis such as on a block-by-block basis. To remap codes, the encoder can simply swap two codes or otherwise reorganize how codes are mapped to symbol combinations. If the encoder is not done (1318), the encoder continues with the encoding.

For example, suppose the initial mapping of codes to symbol combinations is as follows.

TABLE 5

Example default mapping for VLCs

| symbol combination code for set X | bit pattern for codebook 0 |
|---|---|
| SCC_5_0 (for A2-A2) | 0 |
| SCC_5_1 (for A1-A2) | 10 |
| SCC_5_2 (for A0-A2) | 110 |
| SCC_5_3 (for A2-A1) | 1110 |
| SCC_5_4 (for A2-A0) | 1111 |

This mapping presumes a probability distribution of codes (50%, 25%, 12.5%, 6.25%, 6.25%) that may or may not hold during actual encoding. If, during encoding, it turns out that SCC_5_1 is the most common code, the encoder switches the bit patterns so that the shortest bit pattern is used for SCC_5_1.

In some implementations, the encoder tracks occurrences with code counters and swaps codes so that the most commonly occurring codes have shorter bit patterns. Suppose the encoder uses SCC_5_0 twice then uses SCC_5_1 three times. The encoder swaps the bit patterns so that the codebook is:

TABLE 6

Example mapping for VLCs after one swap

| symbol combination code for set X | bit pattern for codebook 0 |
|---|---|
| SCC_5_1 (for A1-A2) | 0 |
| SCC_5_0 (for A2-A2) | 10 |
| SCC_5_2 (for A0-A2) | 110 |
| SCC_5_3 (for A2-A1) | 1110 |
| SCC_5_4 (for A2-A0) | 1111 |

If the encoder then uses SCC_5_2 three times, the encoder swaps the bit patterns for SCC_5_0 and SCC_5_2.

TABLE 7

Example mapping for VLCs after two swaps

| symbol combination code for set X | bit pattern for codebook 0 |
|---|---|
| SCC_5_1 (for A1-A2) | 0 |
| SCC_5_2 (for A0-A2) | 10 |
| SCC_5_0 (for A2-A2) | 110 |
| SCC_5_3 (for A2-A1) | 1110 |
| SCC_5_4 (for A2-A0) | 1111 |

In this example, the encoder counts how many times codes are used and swaps codes when codes in a codebook are not ordered according to their frequency of occurrence. Periodically (e.g., at the beginning of each picture or slice), the encoder can reset the codebooks to use default mappings between bit patterns and symbol combinations.

Example implementations use the adaptive encoding technique (1310) during encoding of coefficient values for a block. Alternatively, an encoder uses the technique (1310) to adapt encoding in another application (for example, audio encoding or general data compression) by shuffling associations between code entries and symbols represented in a codebook.

FIG. 13B is a flowchart illustrating an example technique (1330) for adapting encoding by selecting a codebook from among multiple available codebooks. An encoder such as the encoder (200) of FIG. 2 or other encoder performs the technique (1330).

As in the technique (1310) of FIG. 13A, the encoder uses (1332) a symbol combination code from a codebook during encoding then updates (1334) the history of occurrences of codes. The encoder selectively changes (1336) the codebook used for encoding, selecting from among multiple available codebooks. For example, from time to time, the encoder determines which codebook would provide the best compression efficiency, given the history of occurrences observed during encoding. As shown in Table 2, different codebooks can embody different expected probability distributions for codes. By selecting a codebook whose bit patterns approximately fit the observed history, the encoder can switch to a codebook that is expected to be more efficient. The encoder can check whether to switch codebooks every n sets, every slice or on some other basis. If the encoder is not done (1338), the encoder then continues with the encoding.

Example implementations use the adaptive encoding technique (1330) during encoding of coefficient values for a block. Alternatively, an encoder uses the technique (1330) to adapt encoding in another application (for example, audio encoding or general data compression) by selecting a codebook from among multiple available codebooks.

FIG. 13C is a flowchart illustrating an example technique (1350) for adapting encoding by switching context models (1350). An encoder such as the encoder (200) of FIG. 2 or other encoder performs the technique (1350).

The encoder determines (1352) a context model to use during encoding then performs encoding (1354) with a symbol combination code from a codebook for the context model. For example, the encoder switches between different context models for different coefficient positions in a block of transform coefficients, using one context model when encoding a code for positions 0-63 of a block, using another context model when encoding a code for positions 1-63, using a third context model when encoding a code for positions 1-3, and so on. The encoder can also use different context models when encoding luma blocks and chroma blocks. Typically, a context model is associated with its own codebook or codebooks; for different context models different codebooks can exploit different expected or observed probability distributions for the codes. If the encoder is not done (1356), the encoder then continues with the encoding.

Example implementations use the adaptive encoding technique (1350) during encoding of coefficient values for a block. Alternatively, an encoder uses the technique (1350) to adapt encoding in another application (for example, audio encoding or general data compression) by switching context models.

Alternatively, the encoder uses one or more different adaptive mechanisms when encoding data values.

G. Generalized Decoding Technique

FIG. 14 shows a generalized technique (1400) for decoding data values as a set with a hierarchy of subsets. A decoder such as the decoder (300) of FIG. 3 or other decoder performs the technique (1400).

The decoder receives (1410) encoded data. For example, an entropy decoding module of the decoder receives data values from another module of the decoder, such as a buffer. In video decoding applications, the data values can be quantized transform coefficients for a block of sample values or motion compensation residual values, from an input video picture or picture of inter-layer residual video. Alternatively, the decoder receives encoded data for another kind of data values.

The decoder evaluates (1420) a set symbol of a set and decides (1430) whether a symbol combination code is used for subsets of the set. For example, the decoder checks the set symbol of the set to determine if its value is consistent with a symbol combination code being present in the bit stream. The conditions that the decoder checks depend on implementation details such as the number and definition of elements in the symbol alphabet.

In some cases (e.g., at least one of the data values in the set is non-zero, according to the set symbol for the set), the decoder decodes (1440) a symbol combination code that indicates the set symbols of the subsets of the set. For example, the decoder decodes a symbol combination code as shown in Table 1 or 2. Alternatively, the decoder decodes some other symbol combination code. In other cases (e.g., the set symbol for the set indicates the data values in the set are all zero), the decoder skips the decoding the symbol combination code, since the set symbols of the subsets are implied by the set symbol of the set. The decoder assigns (1450) the set symbols to the respective subsets of the set.

Then, for each of the subsets, the decoder selectively repeats (1460) the decoding using that subset as a new set. For example, if a given subset includes multiple data values, the decoder repeats the evaluating, the selective decoding, the assigning and the selective repetition of decoding operations for the subset. In some implementations, the decoder can skip the repetition (1460) if a given subset includes multiple data values but all of the data values are zero, since symbol type is already implied for the subset (as well as its subsets, if any).

During the decoding of symbol combination codes or after such decoding, the decoder can read from the bit stream sign bits and codes indicating data values, to the extent those data values are not already implied by the set symbols of the subsets in the hierarchy. For example, when the symbol alphabet of FIG. 8 is used, the decoder sets zero values without decoding any value codes, parses a sign bit to set a single value that is 1 or −1, or decodes a VLC and sign bit to set a single value that is greater than 1 or less than −1.

A decoder can use the technique (1400) to decode quantized transform coefficients of a block, CBP information for a macroblock, and/or other data values for image or video decoding. Alternatively, the decoder receives and decodes another type of data. The decoder repeats the technique (1400) on a set-by-set basis (e.g., block-by-block basis for quantized transform coefficients, macroblock-by-macroblock basis for CBP information and blocks of transform coefficients in a macroblock).

H. Example Decoding Technique

Figure 15:
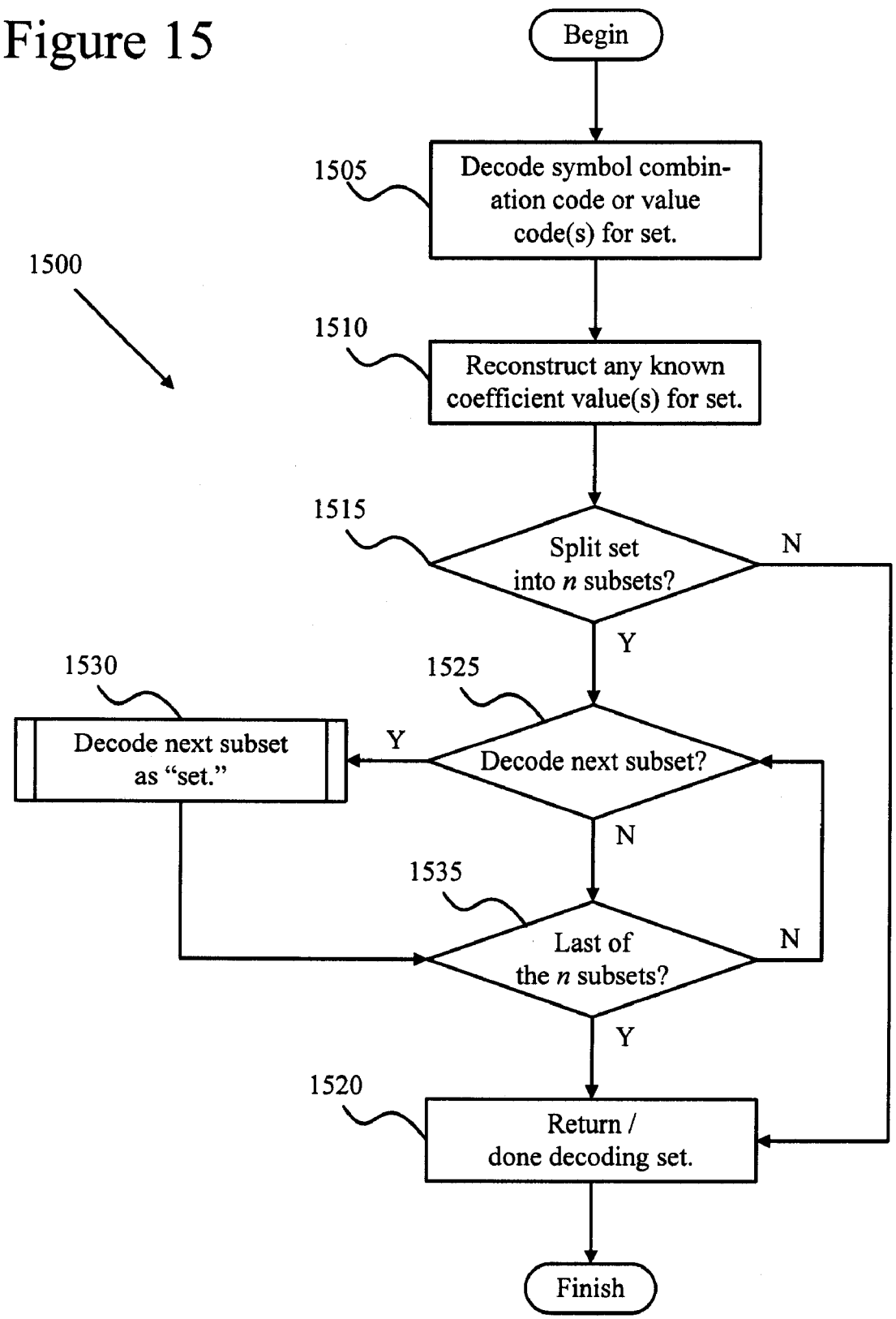
FIG. 15 is a flowchart illustrating an example technique for decoding a set of quantized transform coefficients for a block using a multi-level nested set representation.

FIG. 15 shows a flowchart of an example technique (1500) of reconstructing a block of transform coefficients that was entropy encoded using a multi-level nested set representation. The technique (1500) is a specific variation of the generalized technique (1400) of FIG. 14. With the technique (1500), a decoder follows a depth-first traversal and parses sign bits and VLCs (indicating data value levels) interleaved among symbol combination codes. A decoder such as the decoder (300) of FIG. 3 or other decoder performs the technique (1500).

Aspects of the technique (1500) are recursive. When decoding a set of coefficient values, the technique (1500) in some cases recursively decodes a subset of coefficient values within the set, or each of multiple subsets within the set. The technique (1500) includes an exit condition, upon which the technique (1500) returns to the point of entry or is done decoding the set.

In this technique (1500), the decoder receives at least part of an entropy encoded bit stream comprising information about a set of quantized transform coefficients. The decoder decodes (1505) a symbol combination code or value code(s) for the set and reconstructs (1510) any known coefficient values for the set. If the set includes multiple coefficients and at least one coefficient has a non-zero value, the decoder decodes a symbol combination code that provides information about the relative positions of one or more non-zero coefficients in subsets of the set. If the symbol combination code indicates that any given subset of the set has only zero-value coefficients, the decoder reconstructs the zero-value coefficients for that subset.

If the set includes a single coefficient and the single coefficient is non-zero, the decoder decodes one or more value codes indicating the value of the coefficient. For example, the decoder uses Golomb decoding, Huffman decoding, or another form of variable length decoding to decode the values code(s) for the single coefficient value. When the level of the single coefficient is implied elsewhere (e.g., when the coefficient is −1 or 1 for some types of entropy coding and symbol alphabets), the decoder parses a flag indicating the sign of the single coefficient. Otherwise, the decoder reconstructs the single value from a value code and sign bit.

If a given set include only zero-value coefficients, the decoder does not perform the decoding operation (1505) of the technique (1500). Rather, during an earlier stage, when the decoder identifies the given set as a subset with only zero-value coefficients, the decoder then reconstructs the zero-value coefficients of the given set.

The decoder then selectively splits (1515) the set into n lower level subsets. For some multi-level nested set representations, n is equal to 2, though in other representations n may be equal to another integer such as 3 or 4. The decoder does not split the set into n lower level subsets if, for example, the set contains only a single coefficient. In this case, the decoder has already decoded (1505) the code(s) for this single-valued set and reconstructed (1510) the coefficient value for this set. Thus, the decoder then returns (1520) to the point of entry (for a subset) or is done decoding that particular set.

If the set includes multiple coefficient values, at least one of which is non-zero, the decoder splits the set into up to n subsets. A symbol combination code indicates which of the subsets contain at least one non-zero coefficient. The decoder checks (1525) whether to decode the first of the subsets. If the first subset contains a non-zero coefficient, then the decoder decodes (1530) that subset as a "set" by performing the decoding technique (1500) on the subset. When the decoder returns from the decoding for that subset, the decoder checks (1535) whether there are other subsets remaining to decode. Or, if the first subset is not decoded (e.g., because the first subset contains only zero-value coefficients), the decoder checks (1535) whether there are other subsets remaining to decode. If there are other subsets remaining to decode, then the decoder checks (1525) whether to decode the next of the n subsets. The decoder repeats this process until the check (1535) indicates that there are no other subsets of the given set left to decode, and the decoder returns (1520) to the point of entry (for a subset) or is done decoding the given set. Depending on the coefficient values or number of coefficients in the set being decoded, finishing may cause the decoder to return to decoding a higher level set or finish decoding the block and begin decoding a next block of video.

Alternatively, the decoder decodes another type of data using the technique (1500) of FIG. 15. The decoder repeats the technique (1500) on a set-by-set basis (e.g., block-by-block basis for quantized transform coefficients).

I. Adaptive Decoding Variations

In adaptive variations of the decoding of data values, a decoder uses one or more adaptive mechanisms. The decoder can use the one or more adaptive mechanisms separately or in combination. Generally, the decoder uses adaptive mechanisms that parallel the adaptive mechanisms used by an encoder during encoding, so that the encoder and decoder use the same codebook, context model, code mappings, etc. at the same point of encoding/decoding. For the sake of simplicity, FIGS. 16A, 16B and 16C do not show how the respective techniques relate to other parts of the decoding process.

Figure 16C:
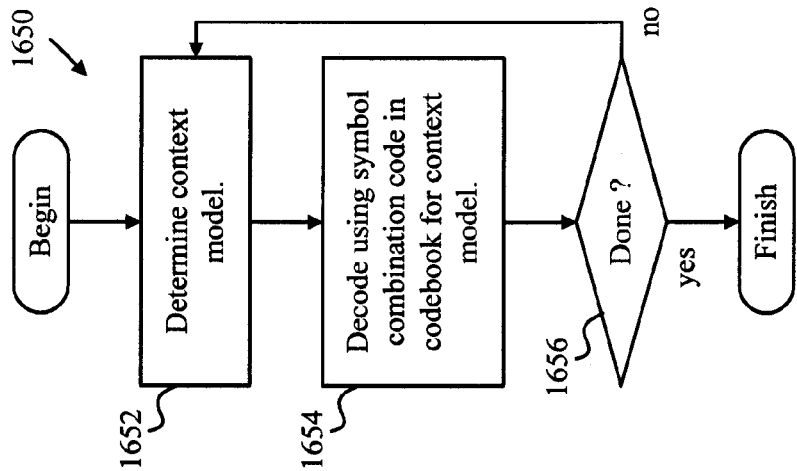
FIGS. 16A, 16B and 16C are flowcharts illustrating example techniques for adaptive decoding that correspond to the encoding techniques of FIGS. 13A, 13B and 13C, respectively.
Figure 16B:
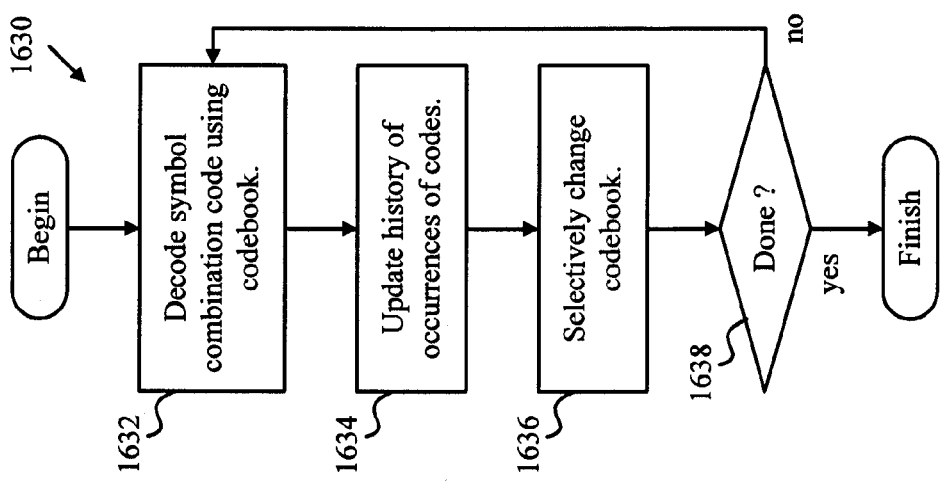
Figure 16A:
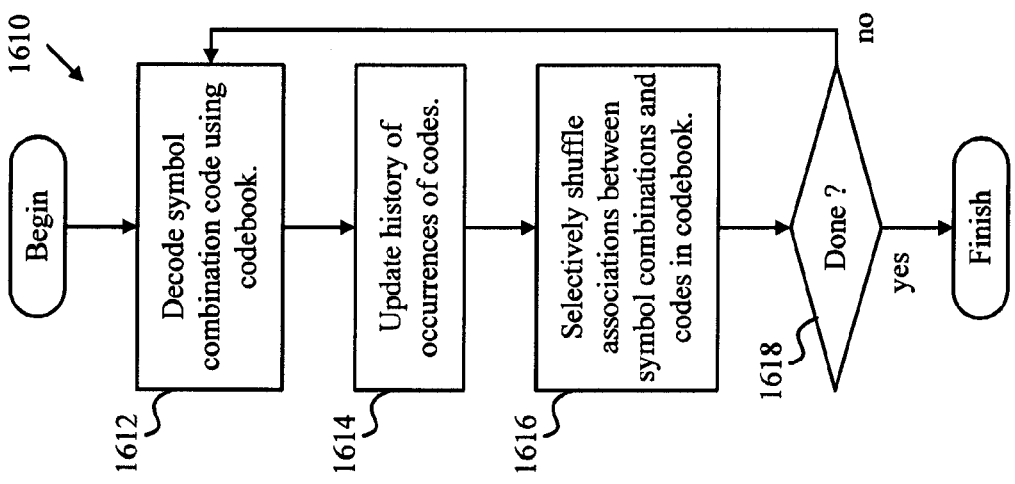

FIG. 16A is a flowchart illustrating an example technique (1610) for adapting decoding by shuffling associations between code entries and set symbol combinations represented in a codebook. A decoder such as the decoder (300) of FIG. 3 or other decoder performs the technique (1610).

The decoder uses (1612) a symbol combination code from a codebook during decoding then updates (1614) the history of occurrences of codes. For example, the decoder tracks how many times each of the codes in the codebook has been used during decoding or during a current period of the decoding. After initializing the data structure or variables used in the tracking, the decoder can increment a counter for each code when the code is decoded, or the decoder can otherwise update the history of occurrences.

The decoder selectively shuffles (1616) the associations between symbol combinations and codes in the codebook. For example, the decoder checks whether to remap codes after each code is decoded and swaps codes when codes in a codebook are not ordered according to their frequency of occurrence. Alternatively, the decoder checks on some other basis such as on a block-by-block basis. To remap codes, the decoder can simply swap two codes or otherwise reorganize how codes are mapped to symbol combinations. If the decoder is not done (1618), the decoder continues with the adaptive decoding. Periodically (e.g., at the beginning of each picture or slice), the decoder can reset the codebooks to use default mappings between bit patterns and symbol combinations.

Example implementations use the adaptive decoding technique (1610) during decoding of coefficient values for a block. Alternatively, a decoder uses the technique (1610) to adapt decoding in another application (for example, audio decoding or general data decompression) by shuffling associations between code entries and symbols represented in a codebook.

FIG. 16B is a flowchart illustrating an example technique (1630) for adapting decoding by selecting a codebook from among multiple available codebooks. A decoder such as the decoder (300) of FIG. 3 or other decoder performs the technique (1630).

As in the technique (1610) of FIG. 16A, the decoder decodes (1632) a symbol combination code from a codebook during decoding then updates (1634) the history of occurrences of codes. The decoder selectively changes (1636) the codebook used for decoding, selecting from among multiple available codebooks. For example, from time to time, the decoder determines which codebook to use, given the history of occurrences observed during decoding. The decoder can check whether to switch codebooks every n sets, every slice or on some other basis. If the decoder is not done (1638), the decoder then continues with the decoding.

Example implementations use the adaptive decoding technique (1630) during decoding of coefficient values for a block. Alternatively, a decoder uses the technique (1630) to adapt decoding in another application (for example, audio decoding or general data decompression) by selecting a codebook from among multiple available codebooks.

FIG. 16C is a flowchart illustrating an example technique (1650) for adapting decoding by switching context models. A decoder such as the decoder (300) of FIG. 3 or other decoder performs the technique (1650).

The decoder determines (1652) a context model to use during decoding then performs decoding (1654) with a symbol combination code from a codebook for the context model. For example, the decoder switches between different context models for different coefficient positions in a block of transform coefficients. The decoder can also use different context models when decoding luma blocks and chroma blocks. Typically, a context model is associated with its own codebook or codebooks. If the decoder is not done (1656), the decoder then continues with the decoding.

Example implementations use the adaptive decoding technique (1650) during decoding of coefficient values for a block. Alternatively, a decoder uses the technique (1650) to adapt decoding in another application (for example, audio decoding or general data decompression) by switching context models.

Alternatively, the decoder uses one or more different adaptive mechanisms when decoding data values.

J. Combined Implementation

This section describes a combined implementation that incorporates many of the decoding techniques described above for decoding of coded block pattern information and blocks of quantized transform coefficients. A decoder such as the decoder (300) of FIG. 3 or other decoder includes the combined implementation.

FIG. 17 shows example data structures and routines for a software class AdaptiveHuffman3 (1700), which implements decoding with a codebook having three codes. The decoding is adaptive in that associations between VLCs and symbol combinations are potentially shuffled when a code is decoded.

The AdaptiveHuffman3 class (1700) includes two data structures. The data structure Symbol[3] is an array used to track which symbol combinations are mapped to which bit patterns. For example, Symbol[3] includes a shuffle of 0, 1 and 2 to represent mappings of SCC_3_0, SCC_3_1 and SCC_3_2 to defined bit patterns 0, 10 and 11, with the shorter code being used for the symbol combination expected to have higher probability of occurrence.

TABLE 8

Default mappings for 3-code codebook in combined implementation

| idx | Symbol[idx] | bit pattern |
|---|---|---|
| 0: | 0 (representing SCC_3_0) | 0 |
| 1: | 1 (representing SCC_3_1) | 10 |
| 2: | 2 (representing SCC_3_2) | 11 |

The data structure Occurrence[3] has three counters, one counter for each of the three symbol combination codes represented in a 3-code codebook. Occurrence[3] tracks how many times each symbol combination represented in the codebook has occurred so far.

TABLE 9

Initialized values for Occurrences[ ] in combined implementation

| Symbol[idx] | Occurrences[Symbol[idx]] |
|---|---|
| 0 (representing SCC_3_0) | 1 |
| 1 (representing SCC_3_1) | 1 |
| 2 (representing SCC_3_2) | 1 |

The reset( ) routine initializes the Occurrences[ ] data structure and sets Symbol[ ] to the default mappings shown in Table 8. The update( ) routine normalizes the Occurrences[ ] structure so that Occurrence[Symbol[0]]≦256.

In the decodeSymbol( ) routine, the decoder reads one or more bits from the bit stream (according to the defined bit patterns 0, 10 and 11 for VLCs) and determines which symbol combination is currently associated with the VLC read from the bit stream. Specifically, in the decodeSymbol( ) routine, the decoder determines the index idx for the VLC read from the bit stream and updates the Occurrences[ ] structure by incrementing the counter associated with the symbol combination at Symbol[idx]. The decoder determines the symbol combination associated with the index idx in the Symbol[ ] array and returns the symbol combination.

Generally, symbol combinations in the Symbol[ ] structure are ordered by decreasing probabilities of occurrence so that Occurrence[Symbol[0]]≧Occurrence[Symbol[1]]≧Occurrence[Symbol[2]]. When the count of occurrences for the symbol combination at Symbol[idx] is greater than the count of occurrences for the symbol combination at Symbol[idx−1], the decoder swaps the two symbol combinations. For example, if the decoder first decodes a code 11 and idx==2 (for the symbol combination for SCC_3_2 according to default mappings), the count of occurrences at Occurrence [Symbol[2]] is greater than the count at Occurrence[Symbol [1]], so the decoder swaps the two entries.

TABLE 10

Mappings after one swap in combined implementation

| idx | Symbol[idx] | bit pattern |
|---|---|---|
| 0: | 0 (representing SCC_3_0) | 0 |
| 1: | 2 (representing SCC_3_2) | 10 |
| 2: | 1 (representing SCC_3_1) | 11 |

The decoder only swaps two adjacent entries, even though it could also swap the entries for SCC_3_2 and SCC_3_0. Alternatively, the decoder performs multiple swaps and/or swaps non-adjacent entries to order Symbol[idx] by history of occurrence.

Suppose that as decoding progresses, the counts of occurrences are 3, 3 and 2 for SCC_3_0, SCC_3_2 and SCC_3_1, respectively. If the decoder then decodes a code 10 and idx==1 (for the symbol combination for SCC_3_2 in Table 10), the count of occurrences at Occurrence[Symbol[1]] is greater than the count of occurrences at Occurrence[Symbol [0]], so the decoder swaps the two entries.

TABLE 11

Mappings after two swaps in combined implementation

| idx | Symbol[idx] | bit pattern |
|---|---|---|
| 0: | 2 (representing SCC_3_2) | 0 |
| 1: | 0 (representing SCC_3_0) | 10 |
| 2: | 1 (representing SCC_3_1) | 11 |

Alternatively, the decoder uses another ordering of operations in the decodeSymbol( ) routine. In general, an encoder encodes a symbol combination using the latest statistics available to the encoder and decoder. So long as the encoder and decoder are consistent in how tracking structures, code mappings, etc. are updated, the ordering of the operations can vary from what is shown in FIG. 17.

FIGS. 18A and 18B show example data structures and routines for a software class AdaptiveHuffman5 (1800), which implements decoding with codebooks having five codes. The decoding is adaptive in that the decoder potentially shuffles associations between VLCs and symbol combinations in a codebook in use when a code is decoded, and in that the decoder periodically selects a different codebook among three available 5-code codebooks.

The AdaptiveHuffman5 class (1800) includes two data structures and a codebook identifier TableIdx. The data structure Occurrence[5] has five counters, one counter for each of the five codes represented in the 5-code codebook currently in use. Occurrence[5] tracks how many times each symbol combination represented in the codebook has occurred so far. The data structure Symbol[5] is an array used to track which symbol combinations are mapped to which bit patterns. For example, the Symbol[ ] array includes a shuffle of 0, 1, 2, 3 and 4 to represent mappings of SCC_5_0, SCC_5_1, SCC_5_2, SCC_5_3 and SCC_5_4 to defined bit patterns in a given codebook, with the shorter code(s) being used for the symbol combination(s) expected to have higher probability of occurrence.

TABLE 12

Default mappings for 5-code codebooks in combined implementation

| idx | Symbol[idx] | bit pattern for TableIdx===0 | bit pattern for TableIdx==1 | bit pattern for TableIdx==2 |
|---|---|---|---|---|
| 0: | 0 (representing SCC_5_0) | 0 | 0 | 00 |
| 1: | 1 (representing SCC_5_1) | 10 | 100 | 01 |
| 2: | 2 (representing SCC_5_2) | 110 | 101 | 10 |
| 3: | 3 (representing SCC_5_3) | 1110 | 110 | 110 |
| 4: | 4 (representing SCC_5_4) | 1111 | 111 | 111 |

The reset( ) routine of the class (1800) sets the codebook for TableIdx==0 as the current codebook, initializes the Occurrences[ ] data structure and sets Symbol[ ] to the default mappings shown in Table 12. The update( ) routine of the class (1800) normalizes the Occurrences[ ] structure so that Occurrence[SymbolMap[0]]≦256. In the update( ) routine, the decoder also selects a codebook to use depending on a cost function that considers the current values of counters in the Occurrences[ ] structure and bit costs for the codes in the different available codebooks.

In the decodeSymbol( ) routine of the AdaptiveHuffman5 class (1800), the decoder reads one or more bits from the bit stream (according to the defined bit patterns) and determines which symbol combination (shown as "symbol") is currently associated with the VLC read from the bit stream. Specifically, in the decodeSymbol( ) routine, the decoder determines the index idx for the VLC read from the bit stream and updates the Occurrences[ ] structure by incrementing the counter associated with the symbol combination at Symbol[idx]. The decoder determines the symbol combination associated with the index idx in the Symbol[ ] array and returns the symbol combination.

Symbol combinations in the Symbol[ ] structure are generally ordered by decreasing probabilities of occurrence so that Occurrence[Symbol[0]]≧Occurrence[Symbol[1]]≧Occurrence[Symbol[2]]≧Occurrence[Symbol[3]]≧Occurrence[Symbol[4]] for a given codebook. When the count of occurrences for the symbol combination at Symbol[idx] is greater than the count of occurrences for the symbol combination at Symbol[idx−1], the decoder swaps the two symbol combinations. Alternatively, the decoder uses another ordering of operations in the decodeSymbol( ) routine, so long as the encoder and decoder are consistent in how tracking structures, code mappings, etc. are updated.

In the combined implementation, a decoder uses 54 different context models when decoding coded block pattern information for a macroblock and quantized transform coefficients for the blocks of the macroblock. Each of the context models has associated with it an instance AH3 of the adaptiveHuffman3 class (1700) and an instance AH5[i] of the adaptiveHuffman5 class (1800). FIG. 19A shows a routine resetModels( ) (1910) that the decoder calls to reset the AH3 codebook and AH5 codebook for each of the context models. For example, the decoder invokes the routine resetModels( ) at the start of each new slice during decoding. FIG. 19B shows a routine updateModels( ) that the decoder calls to invoke the updates routines of the AH3 instance and AH5 instance for each of the context models. For example, the decoder invokes the routine updateModels( ) after decoding of m non-zero macroblocks during decoding, where m is a count such as 16.

Alternatively, an encoder and decoder use different context models for luma and chroma blocks and/or use different context models for different sets of coefficient values in a block in conjunction with another type of entropy encoding and decoding of the coefficient values.

FIG. 20A shows how the decoder uses instances of AH3 and AH5 to decode symbol combination codes that represent pairs of set symbols taken from the alphabet (800) of nested elements shown in FIG. 8. A given symbol combination code jointly represents two set symbols for two subsets of the set. A set of coefficients (having any number of coefficients from 1 to 64) is classified as A0, A1 or A2. For type A0, each of the coefficient(s) in the set is zero. For type A1, not all of the coefficient(s) in the set is zero but any non-zero coefficient is 1 or −1. For type A2, the set is not A0 or A1 and at least one coefficient has an absolute value greater than 1.

FIG. 20A presents the routine decode2( ) (2010), which accepts as input parameters a type parameter that indicates the set symbol for a set and a context_idx parameter that indicates the context model to use in decoding. The routine decode2( ) returns two parameters subtype1 and subtype2 that indicate the respective set symbols of the two subsets of the set. If the set symbol type is A0, the routine decode2( ) returns A0 as the set symbol for each of subtype1 and subtype2. Otherwise, if the set symbol type is A1, the routine decode2( ) calls the decodeSymbol( ) routine of the AH3 instance for the context model and determines the values of subtype1 and subtype2 from the returned result. Or, if the set symbol type is A2, the routine decode2( ) calls the decodeSymbol( ) routine of the AH5 instance for the context model and determines the values of subtype1 and subtype2 from the returned result.

FIGS. 20B and 20C show the routines decode3( ) (2020) and decode4( ) (2030). Each of the routines accepts a type parameter (indicating the set symbol for a set) and a context_idx parameter (indicating a context model to use in decoding). The routine decode3( ) returns three parameters that indicate the respective set symbols of three subsets of the set, and the routine decode4( ) returns four parameters that indicate the respective set symbols of four subsets of the set. Generally, the decoder can call the routine decode3( ) at a 3-way branch in a multi-level nested set representation, and the decoder can call the routine decode4( ) at a 4-way branch in a multi-level nested set representation.

FIGS. 21 and 22 present routines used to decode coded block pattern information and blocks of quantized transform coefficients. In the example routines shown in FIGS. 21 and 22, a macroblock has four Y blocks, two U blocks and two V blocks for 4:2:2 format video. For other chroma sampling rates and macroblock organizations (such as 4:2:0), the internal variables in FIGS. 21 and 22 and number of context models is adjusted accordingly.

As shown in FIG. 21, with the routine decodeMBCoeff( ) (2100), the decoder generally decodes coded block pattern information organized as shown in FIG. 12 to determine set symbols for the blocks of a macroblock. The routine decodeMBCoeff( ) accepts as input the parameter MBType, which is a set symbol taken from the alphabet (800) of FIG. 8, and calls decode2( ) to determine the set symbols YType and UVType for the luma and chroma blocks, respectively, using context model 0. The routine decodeMBCoeff( ) continues decoding, using different context models for different types, until a set symbol BlkType[i] has been decoded for each of the blocks in the macroblock. The decoder then calls the routine decodeBlock( ) for each of the blocks.

As shown in FIG. 22, the routine decodeBlock( ) accepts as input parameters a block index blkIdx (indicating the block being decoded) and a type parameter blkType (indicating the set symbol for the block). The routine decodeBlock( ) sets an initial context model for the block, depending on whether the block is a luma block or chroma block, then begins decoding set symbols for subsets of coefficients according to the multi-level nested set representation (650) of FIG. 6B. In the routine decodeBlock( ), the decoder determines a set symbol for each coefficient value as a subset in the block, first determining the set symbol for the DC coefficient and a set symbol for the AC coefficients. The decoder determines set symbols for subset 1-3, subset 4-15 and subset 16-63, then determines set symbols for the AC coefficients at positions 1-3, respectively. For higher frequency AC coefficients, the decoder determines set symbols for 4×4 sets, then the 2×2 sets of the respective 4×4 sets, then the coefficients of the various 2×2 sets. Then, for each of the coefficient values in the block, the decoder decodes a VLC indicating the level of the coefficient value (if the level is not implied by the set symbol for the coefficient value) and decodes a sign bit (if the sign is not implied for the coefficient value).

In particular, if the set symbol for a coefficient value is A0, the coefficient value is 0 and the bit stream includes no sign bit or level VLC for the coefficient value. If the set symbol for a coefficient value is A1, the absolute value of the coefficient is 1 and a sign bit indicates the sign.

If the set symbol for a coefficient value is A2, the coefficient value v is determined as follows. If $2 \leq v \leq 17$, an intermediate value v is signaled as v−2 binary zeros followed by a binary 1. If 17<v, the intermediate value v is signaled as a prefix part of 16 binary zeros, followed by a code to signal the value bits, followed by a fixed length code having bits bits. The value bits is signaled as bits-1 binary zeros followed by a binary 1. The intermediate value v is initially reconstructed as v=16+readBits(BITS)+(1<<BITS)−2. A sign bit indicates the sign of v. The final value v is set as −(v+2) or v+2, depending on the sign bit.

One advantage of decoding according to the combined implementation is the relatively small memory footprint, since no large code tables are stored in memory, just two 3-byte arrays for AH3 and two 5-byte arrays and table index for AH5 for each of the context models. Another advantage is the relatively small number of if-else branches during decoding, which reduces the frequency of instruction cache misses during decoding.

K. Alternatives

Many of the examples presented herein relate to entropy encoding of an 8×8 block of transform coefficients reordered into a one-dimensional vector of 64 transform coefficients. The techniques and tools can also be applied to 4×8 or 8×4 blocks of transform coefficients reordered into one-dimensional vectors of 32 coefficients, 4×4 blocks of transform coefficients reordered into one-dimensional vectors of 16 coefficients, or other sizes of blocks of transform coefficients.

Similarly, many of the examples of nested set representations presented herein relate to one-dimensional vectors of 64 transform coefficients. The techniques and tools presented herein can also be applied to vectors of length 32, length 16, or some other length. The depth and breadth of the nested set representations depend on implementation, with more aggressive splitting of sets into subsets tending to yield broader, shallower representations, and vice versa.

Many of the examples of alphabets with nested elements presented herein have elements A0, A1 and A2. Alternatively, the techniques and tools presented herein can be applied using alphabets with more nested elements or fewer nested elements, or nested elements having different definitions than A0, A1 and A2.

Many of the examples of encoding and decoding presented herein use symbol combination codes that jointly represent the set symbols of multiple subsets of a set. Alternatively, one or more of the techniques and tools presented herein can be applied using codes that represent scalar symbols.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of decoding video data hierarchically encoded as a set that has subsets with set symbols, the method comprising:
    receiving encoded data; and
    using the encoded data, reconstructing data values hierarchically encoded as a given set, including:
        evaluating a set symbol of the given set;
        selectively decoding a symbol combination code that indicates respective set symbols of plural subsets of the given set, including, when the set symbol of the given set is a first symbol element, skipping the decoding the symbol combination code, and otherwise performing the decoding the symbol combination code;
        assigning the respective set symbols of the plural subsets to the plural subsets of the given set; and
        for each of the plural subsets, selectively repeating the reconstructing when the subset has multiple data values, including, for a given subset of the plural subsets, evaluating the set symbol of the given subset, selectively decoding a symbol combination code that indicates respective set symbols of further subsets of the given subset, assigning the respective set symbols of the further subsets to the further subsets of the given subset, and, for each of the further subsets, selectively repeating the reconstructing for that further subset.

2. The method of claim 1 further comprising setting each of the data values depending on the set symbol of a lowest level subset that includes the data value, including:
    if the set symbol of the lowest level subset that includes the data value is a first symbol element, setting the data value to zero;
    if the set symbol of the lowest level subset that includes the data value is a second symbol element, decoding a sign bit and setting the data value to be 1 or −1; and
    otherwise, decoding a value code and sign bit and setting the data value depending on the value code and sign bit.

3. The method of claim 1 wherein the symbol combination code that indicates the respective set symbols of the plural subsets of the given set is a single variable length code that jointly indicates the respective set symbols of the plural subsets of the given set, and wherein the decoding the symbol combination code uses a codebook whose size depends on symbol element of the set symbol of the given set.

4. The method of claim 2 wherein the set symbol of the given set is selected from among first, second and third symbol elements, wherein the size of the codebook is three when the set symbol of the given set is the second symbol element, and wherein the size of the codebook is five when the set symbol of the given set is the third symbol element.

5. The method of claim 1 wherein the decoding the symbol combination code that indicates the respective set symbols of the plural subsets of the given set uses a codebook, and wherein the method further comprises, based upon history of occurrences of symbol combination codes in the encoded data, selecting the codebook from among plural available codebooks.

6. The method of claim 1 wherein the decoding the symbol combination code that indicates the respective set symbols of the plural subsets of the given set uses a codebook, and wherein the method further comprises, based upon history of occurrences of symbol combination codes in the encoded data, shuffling associations between variable length code entries and set symbol combinations represented in the codebook.

7. The method of claim 1 wherein the decoding the symbol combination code that indicates the respective set symbols of the plural subsets of the given set includes selecting one of plural different context models to adapt to which of the data values are being decoded.

8. The method of claim 1 wherein the given set is a macroblock, the set symbol of the macroblock is for a coded block pattern of the macroblock, and the symbol combination code indicates a luma block type and chroma block type for luma blocks and chroma blocks of the macroblock.

9. The method of claim 1 wherein the given set is a block of a macroblock, the data values in the block are quantized transform coefficients, and each of the plural subsets represents a group of one or more of the quantized transform coefficients.

10. A video encoder comprising a processor and one or more storage media storing computer software instructions for causing a computer system to perform a method of hierarchically encoding data as a set that has subsets with set symbols, the method comprising:
    receiving data values; and
    hierarchically encoding the data values as a given set, including:
        evaluating the data values of the given set;
        selectively encoding a symbol combination code that indicates respective set symbols of plural subsets of the given set, including, when each of the data values in the given set is zero, skipping the encoding the symbol combination code, and otherwise performing the encoding the symbol combination code; and
        for each of the plural subsets, selectively repeating the evaluating, the selectively encoding and the selectively repeating when the subset has multiple data values, including, for a given subset of the plural subsets, evaluating the data values of the given subset, selectively encoding a symbol combination code that indicates respective set symbols of further subsets of the given subset, and, for each of the further subsets, selectively repeating the encoding for that further subset.

11. The video encoder of claim 10 wherein the method further comprises signaling one or more value codes for each of the data values to the extent the data value is not already implied by the set symbol of the lowest level subset that includes the data value, including:
    if the set symbol of the lowest level subset that includes the data value is a first symbol element, signaling no value codes for the data value;
    if the set symbol of the lowest level subset that includes the data value is a second symbol element, signaling a sign bit that indicates whether the data value is 1 or −1; and
    otherwise, signaling a value code and sign bit that indicate the data value.

12. The video encoder of claim 10 wherein the symbol combination code that indicates the respective set symbols of the plural subsets of the given set is a single variable length code that jointly indicates the respective set symbols of the plural subsets of the given set, and wherein the encoding the symbol combination code uses a codebook whose size depends on symbol element of the set symbol of the given set.

13. The video encoder of claim 10 wherein the encoding the symbol combination code that indicates the respective set symbols of the plural subsets of the given set uses a codebook, and wherein the encoding the data values further comprises, based upon history of occurrences of symbol combination codes, selecting the codebook from among plural available codebooks.

14. The video encoder of claim 10 wherein the encoding the symbol combination code that indicates the respective set symbols of the plural subsets of the given set uses a codebook, and wherein the encoding the data values further comprises, based upon history of occurrences of symbol combination codes, shuffling associations between variable length code entries and set symbol combinations represented in the codebook.

15. The video encoder of claim 10 wherein the encoding the symbol combination code that indicates the respective set symbols of the plural subsets of the given set includes selecting one of plural different context models to adapt to which of the data values are being encoded.

16. The video encoder of claim 10 wherein the given set represents a macroblock whose set symbol is for a coded block pattern of the macroblock.

17. The video encoder of claim 10 wherein the given set represents a block whose set symbol is for block type, and wherein each of the plural subsets represents a single quantized transform coefficient or group of plural quantized transform coefficients.

18. A video decoder comprising:

a processor; and one or more storage media storing computer software instructions for causing a computer system to perform a method of decoding quantized transform coefficients hierarchically encoded in plural sets, each of the plural sets having a set symbol and plural subsets with set symbols, wherein the method includes, for each given set of the plural sets, reconstructing the given set by:

evaluating a set symbol of the given set;

selectively variable length decoding a symbol combination code that indicates respective set symbols of the plural subsets of the given set, including skipping the variable length decoding when the set symbol of the given set is a first symbol element and otherwise performing the variable length decoding;

assigning the respective set symbols of the plural subsets to the plural subsets of the given set; and for each of the plural subsets of the given set, repeating the reconstructing when the subset has multiple data values, including for a given subset of the plural subsets of the given set, evaluating the set symbol of the given subset, selectively decoding a symbol combination code that indicates respective set symbols of further subsets of the given subset, assigning the respective set symbols of the further subsets to the further subsets of the given subset, and, for each of the further subsets, repeating the reconstructing for that further subset when the further subset has multiple data values.

19. The video decoder of claim 18 wherein the method further comprises adapting the variable length decoding by one or more of:

selecting a codebook from among plural available codebooks;

shuffling associations between variable length code entries and set symbol combinations represented in the codebook; and selecting one of plural different context models to adapt to which of the quantized transform coefficients are being decoded.

20. A method of hierarchically encoding video data as a set that has subsets with set symbols, the method comprising:

receiving data values; and hierarchically encoding the data values as a given set, including:

evaluating the data values of the given set;

selectively encoding a symbol combination code that indicates respective set symbols of plural subsets of the given set, including, when each of the data values in the given set is zero, skipping the encoding the symbol combination code, and otherwise performing the encoding the symbol combination code; and for each of the plural subsets, selectively repeating the evaluating, the selectively encoding and the selectively repeating when the subset has multiple data values, including, for a given subset of the plural subsets, evaluating the data values of the given subset, selectively encoding a symbol combination code that indicates respective set symbols of further subsets of the given subset, and, for each of the further subsets, selectively repeating the encoding for that further subset.

21. The method of claim 20 wherein the method further comprises signaling one or more value codes for each of the data values to the extent the data value is not already implied by the set symbol of the lowest level subset that includes the data value, including:

if the set symbol of the lowest level subset that includes the data value is a first symbol element, signaling no value codes for the data value;

if the set symbol of the lowest level subset that includes the data value is a second symbol element, signaling a sign bit that indicates whether the data value is 1 or −1; and otherwise, signaling a value code and sign bit that indicate the data value.

22. The method of claim 20 wherein the symbol combination code that indicates the respective set symbols of the plural subsets of the given set is a single variable length code that jointly indicates the respective set symbols of the plural subsets of the given set, and wherein the encoding the symbol combination code uses a codebook whose size depends on symbol element of the set symbol of the given set.

23. The method of claim 20 wherein the encoding the symbol combination code that indicates the respective set symbols of the plural subsets of the given set uses a codebook, and wherein the encoding the data values further comprises, based upon history of occurrences of symbol combination codes, selecting the codebook from among plural available codebooks.

24. The method of claim 20 wherein the encoding the symbol combination code that indicates the respective set symbols of the plural subsets of the given set uses a codebook, and wherein the encoding the data values further comprises, based upon history of occurrences of symbol combination codes, shuffling associations between variable length code entries and set symbol combinations represented in the codebook.

25. The method of claim 20 wherein the encoding the symbol combination code that indicates the respective set symbols of the plural subsets of the given set includes selecting one of plural different context models to adapt to which of the data values are being encoded.

26. The method of claim 20 wherein the given set represents a macroblock whose set symbol is for a coded block pattern of the macroblock.

27. The method of claim 20 wherein the given set represents a block whose set symbol is for block type, and wherein each of the plural subsets represents a single quantized transform coefficient or group of plural quantized transform coefficients.

* * * * *